(12) United States Patent
Kajihara et al.

(10) Patent No.: US 8,329,848 B2
(45) Date of Patent: Dec. 11, 2012

(54) ETHYLENIC COPOLYMER, COMPOSITION CONTAINING THE COPOLYMER AND USE THEREOF

(75) Inventors: Takayuki Kajihara, Funabashi (JP); Hiroshi Uehara, Chiba (JP); Shigenobu Ikenaga, Ichihara (JP); Kiminori Noda, Mobara (JP); Masayoshi Yamaguchi, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 157 days.

(21) Appl. No.: 12/311,186

(22) PCT Filed: Jun. 2, 2008

(86) PCT No.: PCT/JP2008/060149
§ 371 (c)(1),
(2), (4) Date: Mar. 20, 2009

(87) PCT Pub. No.: WO2008/152935
PCT Pub. Date: Dec. 18, 2008

(65) Prior Publication Data
US 2009/0249645 A1    Oct. 8, 2009

(30) Foreign Application Priority Data
Jun. 15, 2007   (JP) ................... 2007-159414

(51) Int. Cl.
C08F 210/02    (2006.01)
C08F 210/08    (2006.01)
C08L 23/08     (2006.01)
C08L 23/18     (2006.01)

(52) U.S. Cl. ............... 526/348.6; 526/348; 525/240; 525/232; 525/333.7; 525/331.9

(58) Field of Classification Search ............... 526/348, 526/348.6; 525/240
See application file for complete search history.

(56) References Cited

U.S. PATENT DOCUMENTS 4,775,722 A * 10/1988 Kobayashi et al. .......... 525/227
(Continued)

FOREIGN PATENT DOCUMENTS

EP     1 086 963 A1    3/2001
(Continued)

OTHER PUBLICATIONS

Sueda et al. (JP 2005-194400; Jul. 21, 2005), abstract and translation in English.*
(Continued)

*Primary Examiner* — Rip A. Lee
(74) *Attorney, Agent, or Firm* — Foley & Lardner LLP

(57) ABSTRACT

An object of the present invention is to provide a novel ethylene-α-olefin copolymer excellent in crosslinking properties; a foamed molded article having a low specific gravity and a low compression set (CS) and a composition capable of producing the foamed molded article, footwear parts composed of a foamed molded article; an ethylenic copolymer composition excellent in balance between weather resistance and mechanical strength, and an electric wire coating material and an electric wire sheath using the ethylenic copolymer composition; and a thermoplastic elastomer capable of producing a molded article excellent in balance between mechanical strength and toughness. The ethylenic copolymer (A) of the present invention is a copolymer composed of only ethylene and an α-olefin having 3 to 20 carbon atoms, and is characterized in that vinyl-group content (a) per 1000 carbon atoms as measured by infrared absorption spectroscopy, $MFR_{10}/MFR_{2.16}$ (b), and the specific gravity (c) are within a specific range.

19 Claims, 1 Drawing Sheet

U.S. PATENT DOCUMENTS

| | | | |
|---|---|---|---|
| 5,407,965 A | | 4/1995 | Park et al. |
| 5,614,315 A | * | 3/1997 | Kondo et al. ............... 428/332 |
| 5,814,714 A | * | 9/1998 | Palomo et al. ............... 526/336 |
| 6,140,441 A | | 10/2000 | Hakuta et al. |
| 6,140,443 A | | 10/2000 | Monoi et al. |
| 6,420,507 B1 | * | 7/2002 | Kale et al. ................ 526/348 |
| 6,632,911 B1 | * | 10/2003 | Takahashi et al. ......... 526/348.1 |
| 6,673,464 B2 | * | 1/2004 | Matayoshi et al. ........... 428/517 |
| 6,723,794 B2 | | 4/2004 | Kawasaki et al. |
| 6,825,253 B2 | * | 11/2004 | Easter ......................... 524/87 |
| 6,841,583 B2 | * | 1/2005 | Sueda et al. ................ 521/134 |
| 6,982,311 B2 | * | 1/2006 | Karande et al. ........... 526/348.1 |
| 7,393,965 B2 | * | 7/2008 | Tohi et al. ..................... 556/11 |
| 2002/0183408 A1 | | 12/2002 | Sueda et al. |

FOREIGN PATENT DOCUMENTS

| | | |
|---|---|---|
| JP | 59-51905 | 3/1984 |
| JP | 8-127680 | 5/1996 |
| JP | 9-12790 | 1/1997 |
| JP | 9-501447 | 2/1997 |
| JP | 11-5818 | 1/1999 |
| JP | 11-206406 | 8/1999 |
| JP | 2001-522399 | 11/2001 |
| JP | 2005-194400 A * | 7/2005 |
| JP | 2006-249136 | 9/2006 |
| JP | 2007-39541 | 2/2007 |
| KR | 2002-0060270 | 7/2002 |
| WO | WO 98/45340 | 10/1998 |
| WO | WO 00/53648 A1 | 9/2000 |
| WO | WO 2007/077732 A1 | 7/2007 |

OTHER PUBLICATIONS

Communication (Supplementary EP Search Report) in EP Appln No. 08777100.2 dated Jul. 20, 2010.

* cited by examiner

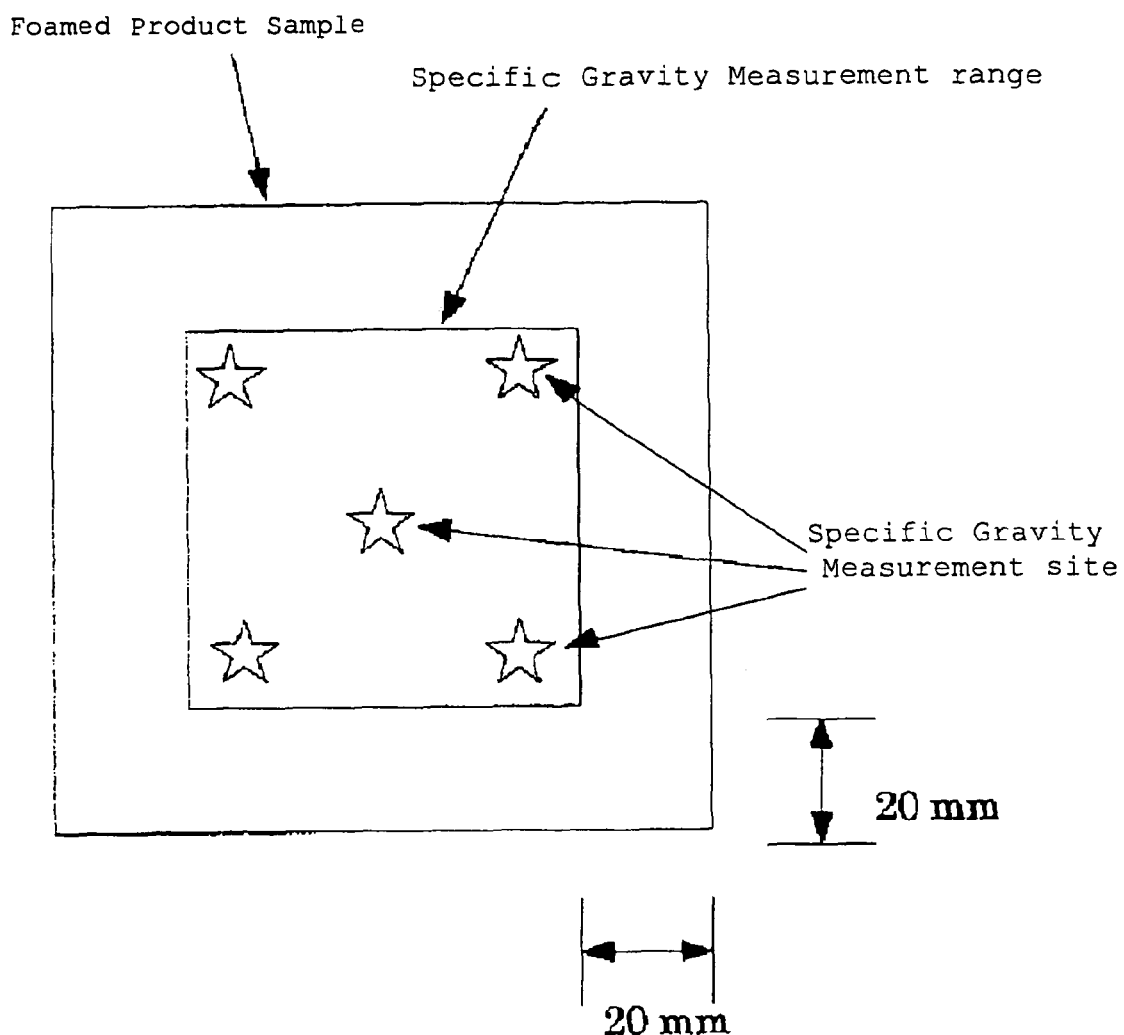

ETHYLENIC COPOLYMER, COMPOSITION CONTAINING THE COPOLYMER AND USE THEREOF

TECHNICAL FIELD

The present invention relates to an ethylenic copolymer, a composition containing the copolymer and their use. More specifically, the present invention relates to a novel ethylenic copolymer composed of only ethylene and an α-olefin and having excellent cross-linking properties, a composition containing the copolymer and to use thereof.

BACKGROUND OF THE INVENTION

An ethylene-α-olefin copolymer has been conventionally used for various applications.

For example, since a crosslinked foamed product using an ethylene-α-olefin copolymer is high in mechanical strength and is lightweight and flexible, it is used for interior and exterior materials for construction, automotive parts such as door glass run channels and the like, packaging materials, daily necessities, and others. Here, since a non-crosslinked foamed product is weight-reduced but is low in mechanical strength, when it is used for the applications as described above, the mechanical strength has been improved by subjecting a resin to crosslinking reaction to bond molecular chains in the foamed product.

In addition, the crosslinked foamed product of a resin is also used for footwears or footwear parts, for example, soles (mainly, midsoles) of sports shoes or the like. The reason is that it is required for footwears or footwear parts to have a condition in which they are lightweight and have a mechanical strength and rebound resilience high enough to inhibit deformation caused by long-term use and to withstand severe use conditions.

It is widely known that crosslinked foamed products of ethylene-vinyl acetate copolymers are conventionally used for shoe soles. However, since the crosslinked foamed products, which are molded using the ethylene-vinyl acetate copolymer composition, have a high specific gravity and a high-compression set, when used, for example, for shoe soles, there is a problem that the soles are heavy and compressed by long-term use and the mechanical strength such as rebound resilience and the like is losing.

In Patent Documents 1 and 2, there are described inventions, respectively, relating to a crosslinked foamed product using an ethylene-α-olefin copolymer and a crosslinked foamed product using a mixture of an ethylene-vinyl acetate copolymer and an ethylene-α-olefin copolymer. However, these inventions improve low specific gravity properties and low compression set properties, but do not provide sufficient performance. In addition, in Patent Document 3, there is described an ethylene-α-olefin-specific non-conjugated polyene random copolymer. However, it becomes clear from the studies of the present inventors that there is a room for improvement from the standpoint of providing a foamed product with consistent quality and having a low specific gravity and a low compression set (CS). For this reason, there is a demand for the appearance of a foamed product with consistent quality and having a low specific gravity and a low compression set (CS) and an ethylene-α-olefin copolymer and a composition having high crosslinking properties which may be used for the production of the foamed product.

In addition, the present applicant has proposed a resin composition containing an ethylene-α-olefin copolymer and an ethylenic copolymer rubber (see Patent Document 4). When the resin composition is used as a raw material for coating an electric wire, it is disclosed that the resin composition is more excellent in balance between weather resistance and mechanical strength, compared to the case where a copolymer containing an ethylene-propylene-diene rubber is used as a raw material for coating an electric wire (for example, see Patent Document 5). However, a further improvement has been demanded in the balance between weather resistance and mechanical strength when the resin composition is used for wire coating.

On the other hand, an olefinic thermoplastic elastomer is used for automotive parts, industrial machine parts, electronic and electric device parts, building materials and the like as an alternative of a vulcanized rubber. However, there is a demand for a material having excellent tensile strength, breaking elongation and rubber elasticity. For example, it is known that a molded article having a low-temperature property and tensile strength, which is improved as compared with a conventional vulcanized-rubber, is produced by the use of a composition containing a crystalline polyolefin resin and an ethylene-α-olefin-non-conjugated polyene copolymer rubber prepared using a metallocene catalyst (see patent Document 6). However, there has been a demand for the appearance of a thermoplastic elastomer capable of producing a molded article that is more excellent in balance between mechanical strength and toughness such as tensile elongation and the like.

Patent Document 1: Japanese Patent Application Laid-Open No. H09-501447
Patent Document 2: Japanese Patent Laid-Open Publication No. H11-206406
Patent Document 3: Japanese Patent Laid-Open Publication No. H11-5818
Patent Document 4: Japanese Patent Laid-Open Publication No. 2006-249136
Patent Document 5: Japanese Patent Laid-Open Publication No. H08-127680
Patent Document 6: Japanese Patent Laid-Open Publication No. H09-12790

DISCLOSURE OF THE INVENTION

Problems to be Solved by the Invention

An object of the present invention is to provide a novel ethylene-α-olefin copolymer excellent in crosslinking properties. In addition, another object if the present invention is to provide a foamed molded article with consistent quality and having a low specific gravity and a low compression set (CS), which is suitable for footwear parts or the like, an ethylenic copolymer composition capable of producing the foamed product and footwear parts composed of the foamed molded article. In addition, a further another object of the present invention is to provide an ethylenic copolymer composition which is suitable for electric wire coating or the like and is excellent in balance between weather resistance and mechanical strength, and an electric wire coating material and an electric wire sheath using the ethylenic copolymer composition. Furthermore, another object of the present invention is to provide a thermoplastic elastomer that is suitably used as an alternative of a vulcanized rubber and capable of producing a molded article excellent in balance between mechanical strength and toughness such as tensile elongation or the like.

Means to Solve the Problems

An ethylenic copolymer (A) of the present invention is a copolymer composed of only ethylene and an α-olefin having 3 to 20 carbon atoms, characterized by satisfying the following requirements (a), (b) and (c):

(a) α-vinyl-group content per 1000 carbon atoms is 0.06 to 1 as measured by infrared absorption spectroscopy,
(b) a $MFR_{10}/MFR_{2.16}$ is 8.5 or less, and
(c) a density is 0.850 to 0.910 g/cm$^3$.

Such an ethylenic copolymer (A) of the present invention further preferably satisfies the following requirement (d); (d) the melt flow rate (MFR, ASTM D1238) at 190° C. under a load of 2.16 kg is 0.01 to 200 g/10 min.

A first ethylenic copolymer composition of the present invention is characterized by containing the ethylenic copolymer (A) and an ethylene-polar monomer copolymer (B1) in a proportion of 100 to 20 parts by mass of (A) and 0 to 80 parts by mass of (B1) (here, it is provided that the total of (A) and (B1) is 100 parts by mass).

The first ethylenic copolymer composition of the present invention preferably contains a radical generator (C) in the range of 0.1 to 2.0 parts by mass based on the total 100 parts by mass of the ethylenic copolymer (A) and the ethylene-polar monomer copolymer (B1), and also preferably contains the radical generator (C) in the range of 0.1 to 2.0 parts by mass and a foaming agent (D) in the range of 0.1 to 30 parts by mass based on the total 100 parts by mass of the ethylenic copolymer (A) and the ethylene-polar monomer copolymer (B1).

A foamed molded article of the present invention is characterized in that it is obtained by crosslinking foaming of the first ethylenic copolymer composition of the present invention. The foamed molded article of the present invention is preferably composed by laminating a layer composed of one or more kinds of raw materials selected from the group consisting of polyolefin, polyurethane, rubber, leather and artificial leather and a foamed molded article obtained by crosslinking foaming of the first ethylenic copolymer composition of the present invention.

Preferably the foamed molded article of the present invention is footwear parts, and more preferably the footwear parts are midsoles, inner soles or soles.

A method for producing the foamed molded article of the present invention is characterized by crosslinking foaming of the first ethylenic copolymer composition of the present invention.

In addition, the method for producing the foamed molded article of the present invention is characterized by including a step of crosslinking foaming of the first ethylenic copolymer composition of the present invention and a step of compression molding of the resulting foamed product.

A second ethylenic copolymer composition of the present invention is characterized by containing the ethylenic copolymer (A) and an ethylene-α-olefin having 3 to 20 carbon atoms-non-conjugated polyene copolymer (B2) in which the content of the constitutional unit derived from ethylene is 50 to 85% by mole and the content of the constitutional unit derived from non-conjugated polyene is 0.01 to 30% by mole (here, it is provided that the total of the constitutional unit derived from ethylene, the constitutional unit derived from an α-olefin having 3 to 20 carbon atoms and the content of the constitutional unit derived from non-conjugated polyene is 100% by mole) in a proportion of 100 to 31 parts by mass of (A) and 0 to 69 parts by mass of (B2) (here, it is provided that the total of (A) and (B2) is 100 parts by mass).

Such second ethylenic copolymer composition of the present invention preferably contains an inorganic filler in the range of 1 to 250 parts by mass, based on the total 100 parts by mass of the ethylenic copolymer (A) and the ethylene-α-olefin having 3 to 20 carbon atoms-non-conjugated polyene copolymer (B2).

Further, the second ethylenic copolymer composition of the present invention preferably also contains a radical generator (C) in the range of 0.1 to 15 parts by mass, based on the total 100 parts by mass of the ethylenic copolymer (A) and the ethylene-α-olefin having 3 to 20 carbon atoms-non-conjugated polyene copolymer (B2).

In addition, the second ethylenic copolymer composition of the present invention preferably has a Mooney viscosity ($ML_{1+4}$) of the ethylene-α-olefin having 3 to 20 carbon atoms-non-conjugated polyene copolymer (B2) at 100° C. in the range of 10 to 300.

A molded article of the present invention is characterized in that it is obtained from the second ethylenic copolymer composition of the present invention and is preferably obtained by crosslinking the ethylenic copolymer composition.

Such a molded article of the present invention is preferably an electric wire coating material or an electric wire sheath. The electric wire of the present invention is characterized in that it is provided with an electric wire coating material and/or an electric wire sheath composed of the molded article of the present invention.

The thermoplastic elastomer of the present invention is characterized in that it is obtained by dynamically crosslinking a mixture containing 10 to 99 parts by mass of the ethylenic copolymer (A) and 90 to 1 part by mass of a crystalline propylenic polymer (B3) (provided that the total of (A) and (B3) is 100 parts by mass).

Effect of the Invention

The ethylenic copolymer (A) of the present invention may be suitably used for various crosslinking molding because it has a high vinyl-group content and is excellent in crosslinking properties, and when used for crosslinking foaming, a foamed product having a low specific gravity and a low compression set is produced.

The first ethylenic copolymer composition of the present invention is suitable for crosslinking foaming and a foamed molded article may be molded. Since the foamed molded article of the present invention has a low specific gravity, an excellent mechanical strength and a low compression set, it may be suitably used for various applications, and it is also preferably used to produce a foamed molded article laminated with various raw materials and may be suitably used especially as footwear parts such as midsoles, inner soles, soles and the like. The footwear parts of the present invention are light weight, excellent in mechanical strength and have a small compression set, and are suitable for sole materials of sports shoes, and the like.

In addition, since the second ethylenic copolymer composition of the present invention is suitable for crosslinking molding and the resulting molded article is excellent in properties such as flexibility, heat resistance, weather resistance and the like, it is used for various applications as a raw material in place of EPDM (ethylene-propylene-diene rubber), and a molded article alternative to an EPDM product may be produced at a low cost. The second ethylenic copolymer composition of the present invention is suitably used for the application of especially an electric wire coating material or an electric wire sheath. Since the electric wire of the present invention is provided with an electric wire coating material and/or electric wire sheath that are formed from the second ethylenic copolymer composition of the present invention, it is excellent in flexibility, heat resistance, weather resistance and the like, and may be produced at a lower cost compared to the case where it is obtained using EPDM and the like.

The thermoplastic elastomer of the present invention, which is an elastomer obtained by dynamically crosslinking a mixture containing the ethylenic copolymer (A) of the present invention and a crystalline propylenic polymer, may be produced at low cost, is excellent in mechanical properties and may be used for various applications as in EPDM.

BRIEF DESCRIPTION OF THE DRAWINGS

FIG. 1 is a schematic view showing the specific gravity measurement range and five specific gravity measurement sites (shown by asterisks) on a flat surface of a foamed molded sample. Here, the specific gravity measurement range is set in a range of 20 mm or more inward from each of the four sides of the flat surface of the foamed molded sample.

BEST MODE FOR CARRYING OUT THE INVENTION

Hereinafter, the present invention will be specifically explained.

<Ethylenic Copolymer (A)>

The ethylenic copolymer (A) of the present invention is a copolymer composed of only ethylene and an α-olefin having 3 to 20 carbon atoms and preferably is a copolymer composed of ethylene and an α-olefin having 3 to 10 carbon atoms. The α-olefin having 3 to 20 carbon atoms, which is a copolymerization component, may be one kind alone, or two or more kinds.

The type of the α-olefin constituting the ethylenic copolymer (A) is clear from the type of a copolymerization monomer in producing the ethylenic copolymer (A). However, the type of the α-olefin in an ethylenic copolymer may be identified, for example, by measuring the $^{13}$C-NMR spectra of a sample obtained by uniformly dissolving approximately 200 mg of an ethylenic copolymer in 1 mL of hexachlorobutadiene in a sample tube with a diameter of 10 mm under the measurement conditions of a temperature of 120° C., a frequency of 25.05 MHz, a spectrum width of 1500 Hz, a pulse repeating time of 4.2 seconds and a 45 degree-pulse width of 6 μsec. In the present invention, the ethylene content of the ethylenic copolymer (A) is not particularly limited but is usually 50 to 95% by mole in the total constitutional units.

The ethylenic copolymer (A) of the present invention satisfies the following requirements (a), (b) and (c), and preferably simultaneously satisfies the following requirements (a), (b), (c) and (d).

(a) the vinyl-group content per 1000 carbon atoms is 0.06 to 1, as measured by infrared absorption spectroscopy,
(b) the ratio, $MFR_{10}/MFRR_{2.16}$ is 8.5 or less,
(c) the density is 0.850 to 0.910 g/cm$^3$, and
(d) the melt flow rate (MFR, ASTM D1238) at 190° C. under a load of 2.16 kg is 0.01 to 200 g/10 min.

Hereinafter, these requirements will be further explained.

(a) Vinyl-Group Content

The ethylenic copolymer (A) of the present invention has a vinyl-group content from 0.06 to 1, preferably from 0.06 to 0.8, more preferably from 0.06 to 0.5 and furthermore preferably from 0.06 to 0.2 per 1000 carbon atoms. In the present invention, the vinyl-group content in a polymer is determined by infrared absorption spectroscopy (IR method).

In the ethylenic copolymer (A), a vinyl group is usually present at the terminal of a copolymer. The ethylenic copolymer (A) of the present invention is excellent in crosslinking properties because it has a relatively high vinyl-group content, that is, 0.06 to 1 per 1000 carbon atoms. However, if the ethylenic copolymer (A) has a vinyl-group content of 1 or more per 1000 carbon atoms, the vinyl-group amount of a copolymer becomes excessively large and the crosslinkage or breakage of the polymer main chain easily excessively occurs during the hot molding processing, there may cause problems such as the variation in $MFR_{2.16}$, burning and the like during the molding processing.

In addition, in the present specification, the quantification of the vinyl group may be typically performed by (1) preparing a mixed sample using a polyethylene containing neither vinyl type unsaturated bond nor vinylidene type unsaturated bond and 1,2-polybutadiene (the vinyl-group content of which is already known) and preparing a calibration curve by performing infrared absorption measurements, and then (2) performing infrared absorption measurements for the measurement sample and (3) calculating. Further, it is confirmed that polyethylene contains neither vinyl type unsaturated bond nor vinylidene type unsaturated bond by the fact that no absorption band is observed in the region between 1000 cm$^{-1}$ and 850 cm$^{-1}$ by infrared absorption measurements. Specifically, the quantification of the vinyl group was carried out in the following manner using an infrared spectrophotometer FT-IR 350 Type manufactured by JASCO Corporation.

By using, as standard samples, a powder of polyethylene (HI-ZEX 2200J (trade Name), manufactured by Prime Polymer Co., Ltd.) containing neither vinyl type unsaturated bond nor vinylidene type unsaturated bond and 1,2-polybutadiene (double-bond amount of which is already known, BR830, manufactured by JSR Corporation) as a vinyl group type olefin, approximately 5 g of each sample was weighed to the fourth decimal place, and both of the samples were dissolved in chloroform at 23° C., and then the chloroform was evaporated to obtain a mixed sample. An infrared absorption measuring film was prepared from the mixed sample by hot rolling at 180° C. In addition, the vinyl-group content in BR830 manufactured by JSR Corporation is 93% by mole (by infrared absorption spectroscopy, Molello method), and using this value, the number of vinyl-type double bonds in the 1,2-polybutadiene per 1000 carbon atoms is calculated. Then, samples having the different numbers of vinyl-type double bonds (n: vinyl content per 1000 carbon atoms), in which the mixing ratio between polyethylene and vinyl type olefin was changed, were subjected to 5-level infrared absorption measurement in the range of n from 0.05 to 1 to obtain a common tangent line at the maximum point in the vicinity of 940 to 850 cm$^{-1}$. The common tangent line was used as a base line, and the absorbance $D_s$ at the key band (910 cm$^{-1}$) of the vinyl group and the value $D_0$ of the base line were read out. Further, the thickness L (cm) of each sample was accurately read out by a micrometer, and the absorbance $D/L=(D_s-D_0)/L$ of each sample per the unit thickness of the key band was calculated. Then, a relationship between the absorbance and the number n of the vinyl-type double bonds is graphically represented to obtain a calibration curve for the vinyl-group amount per 1000 carbon atoms.

For the sample to be measured, an infrared absorption measuring film was prepared by hot rolling and D/L was determined in the same manner as described above. The calibration curve obtained above was used to calculate the vinyl-group amount per 1000 carbon atoms.

(b) $MFR_{10}/MFR_{2.16}$

The ethylenic copolymer (A) of the present invention has the ratio $MFR_{10}/MFR_{2.16}$ of 8.5 or less, preferably 8.0 or less and more preferably 4.0 to 8.0. Here, $MFR_{10}$ represents a melt flow rate (g/10 min) measured at 190° C. under a load of 10 kg in accordance with ASTM D1238, and $MFR_{2.16}$ represents a melt flow rate (g/10 min) measured at 190° C. under a load of 2.16 kg in accordance with ASTM D1238.

The ratio $MFR_{10}/MFR_{2.16}$ is an index of the degree of long chain branching of a copolymer. If a copolymer has an $MFR_{10}/MFR_{2.16}$ value of 8.5 or less, it is represented that the copolymer has less long chain branching.

(c) Density

The ethylenic copolymer (A) of the present invention has a density from 0.850 to 0.910 g/cm³ and preferably from 0.855 to 0.910 g/cm³. Further, the density of the ethylenic copolymer (A) of the present invention is a value measured at 23° C. in accordance with ASTM D1505.

If the density satisfies the range, the ethylenic copolymer (A) is excellent in balance between the rigidity and the impact-resistant strength.

(d) MFR

The melt flow rate (MFR, ASTM D1238) at 190° C. under a load of 2.16 kg of the ethylenic copolymer (A) of the present invention is appropriately selected depending on the applications and is not particularly limited, but is preferably from 0.01 to 200 g/10 min, more preferably from 0.1 to 100 g/10 min, further more preferably from 0.1 to 40 g/10 min, especially preferably from 0.1 to 25 g/10 min and most preferably from 0.1 to 10 g/10 min.

<Production Method of Ethylenic Copolymer (A)>

Olefin Polymerization Catalyst

The ethylenic copolymer (A) of the present invention has the properties and its production method is not particularly limited. However, the ethylenic copolymer (A) may be produced, for example, by copolymerizing ethylene with one or more kinds selected from α-olefins having 3 to 20 carbon atoms in the presence of an olefin polymerization catalyst comprised of the following catalyst components [A] and [B].

[A] A crosslinked metallocene compound represented by the following general formula [I]

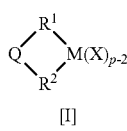

[Chemical Formula 1]

[I]

(In the formula [I], M represents a transition metal, p represents a valence of a transition metal, X may be the same or different from each other and each represents a hydrogen atom, a halogen atom or a hydrocarbon radical, $R^1$ and $R^2$ may be the same or different from each other and each represents a n-electron conjugated ligand coordinated to M, and Q represents a divalent radical crosslinking two n-electron conjugated ligands $R^1$ and $R^2$.)

[B] At least one kind of compounds selected from an organoaluminum oxy compound (b-1), a compound (b-2) forming an ion pair by reacting with the metallocene compound [A], and an organoaluminum compound (b-3).

The copolymerization may be carried out, for example, by solution polymerization of ethylene and one or more kinds of monomers selected from α-olefins at a temperature range of 0 to 200° C. in the presence of the olefin polymerization catalyst under the coexistence of a solvent.

However, the ethylenic copolymer (A) according to the present invention may be produced without any limitation of the production method as long as the properties are satisfied, and may be prepared, for example, by a technique of reactor blending, physical blending or the like by the use of a metallocene compound having a structure different from the formula [I], a co-catalyst other than the catalyst component [B] or well-known two or more kinds of ethylenic copolymers.

Hereinafter, there will be further explained the method of producing the ethylenic copolymer (A) in which ethylene and one or more kinds selected from α-olefins having 3 to 20 carbon atoms are copolymerized in the presence of an olefin polymerization catalyst containing the catalyst components [A] and [B].

Catalyst Component [A]

The catalyst component [A] is a crosslinked metallocene compound represented by the formula [I]. In the formula [I], the transition metal represented by M includes Zr, Ti, Hf, V, Nb, Ta and Cr, preferred transition metal is Zr, Ti or Hf, and more preferred transition metal is Zr or Hf.

In the general formula [I], as the n-electron conjugated ligand represented by $R^1$ and $R^2$, there may be mentioned a ligand having an η-cyclopentadienyl structure, an η-benzene structure, an η-cycloheptatrienyl structure and an η-cyclooctatetraene structure, and especially a ligand having an η-cyclopentadienyl structure is preferred. The ligand having an η-cyclopentadienyl structure includes, for example, a cyclopentadienyl group, an indenyl group, a hydrogenated indenyl group, a fluorenyl group and the like. These groups may be further substituted with a halogen atom; a hydrocarbon group such as alkyl, aryl, aralkyl, alkoxy, aryloxy and the like; a hydrocarbon group-containing silyl group such as a trialkyl silyl group and the like; a chain or cyclic alkylene group; and others.

In the general formula [I], a group crosslinking $R^1$ and $R^2$ represented by Q is not particularly limited as long as it is a divalent group, and includes, for example, a linear or branched alkylene group, an unsubstituted or substituted cycloalkylene group, an alkylidene group, an unsubstituted or substituted cycloalkylidene group, an unsubstituted or substituted phenylene group, a silylene group, a dialkyl-substituted silylene group, a germyl group, a dialkyl-substituted germyl group, and the like.

The catalyst component [A] may be specifically exemplified by the metallocene complexes used in Examples described later, but is not limited to these compounds.

Such a catalyst component [A] is preferably used as an olefin-polymerization catalyst together with a catalyst component-[B].

Catalyst Component [B]

When a catalyst component [A] is used as a component of an olefin polymerization catalyst for producing the ethylenic copolymer (A), the olefin polymerization catalyst preferably contains a catalyst component [B] constituted of at least one kind of compounds selected from an organoaluminum oxy compound (b-1), a compound (b-2) forming an ion pair by reacting with the catalyst component [A] and an organoaluminum compound (b-3). Here, the catalyst component [B] is preferably used in any of the following embodiments [c1] to [c4] from the viewpoint of polymerization activity and the properties of the resulting olefin polymer.

[c1] an organoaluminum oxy compound (b-1) only,

[c2] an organoaluminum oxy compound (b-1) and an organoaluminum compound (b-3),

[c3] a compound (b-2) forming an ion pair by reacting with the catalyst component [A] and an organoaluminum compound (b-3), and

[c4] an organoaluminum oxy compound (b-1) and a compound (b-2) forming an ion pair by reacting with the catalyst component [A].

However, when a metallocene compound in which Q is a silylene group in the general formula [I] is used as the catalyst component [A], a compound (b-2) forming an ion pair by reacting with the catalyst component [A] is not used as the component [B], and only [c1] and [c2] are adopted in [c1] to [c4] as the preferred component [B].

Hereinafter, there will be specifically explained each of the components capable of constituting the catalyst component [B].

Organoaluminum Oxy Compound (b-1)

As the organoaluminum oxy compound (b-1), a conventionally well-known aluminoxane may be used as it is. Specifically, there may be mentioned a compound represented by the following general formulas [II] and/or [III].

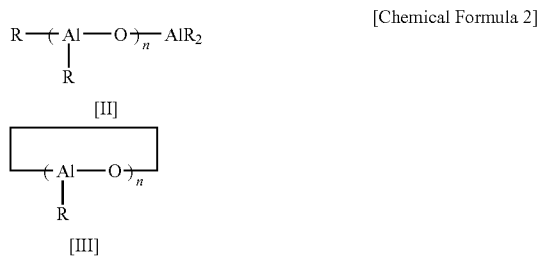

[Chemical Formula 2]

There may be mentioned a compound represented by the general formula [II] or [III] (in the formula [II] or [III], R represents a hydrocarbon group having 1 to 10 carbon atoms and n represents an integer of 2 or more), and a methylaluminoxane in which R is especially a methyl group and n is 3 or more and preferably 10 or more is used. (Hereinafter, an organoaluminum oxy compound in which R is a methyl group in the general formula [II] or [III] may be referred to as a "methylaluminoxane".)

In addition, as the organoaluminum oxy compound (b-1), a methylaluminoxane analogue which is dissolved in a saturated hydrocarbon is also preferably used, and a modified methylaluminoxane represented by the following general formula [IV] may be mentioned, for example.

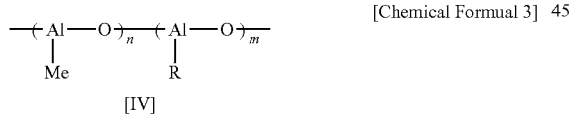

[Chemical Formual 3]

(In the formula [IV], R represents a hydrocarbon group having 2 to 20 carbon atoms, and m and n represent an integer of 2 or more.)

The modified methylaluminoxan represented by the general formula [IV] is prepared using trimethylaluminum and alkylaluminum other than the trimethylaluminum (for example, the production method is disclosed in U.S. Pat. Nos. 4,960,878, 5,041,584 and the like) and is commercially produced under the trade name of MMAO and TMAO in which R is an isobutyl group, which is prepared using trimethylaluminum and triisobutylaluminum by a manufacturer such as Toso Finechem Corporation and the like (for example, see "Toso Research and Technology Report" Vol. 47, 55 (2003)).

Further, as the organoaluminum oxy compound (b-1), an organoaluminum oxy compound insoluble in benzene may also be used, which is mentioned in Japanese Patent Laid-Open Publication No. H02-78687 and an organoaluminum oxy compound containing boron represented the following general formula [V] may also be used.

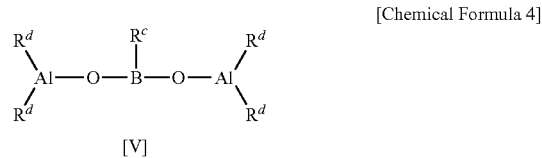

[Chemical Formula 4]

(In the formula [V], $R^c$ represents a hydrocarbon group having 1 to 10 carbon atoms. $R^d$ may be the same or different from each other and represents a hydrogen atom, a halogen atom or a hydrocarbon group having 1 to 10 carbon atoms.)

Further, some amount of an organoaluminum compound may be mixed in the organoaluminum oxy compound (b-1) described above.

Compound (b-2) Forming an Ion Pair by Reacting with Catalyst Component [A]

As the compound (b-2) forming an ion pair by reacting with the catalyst component [A] (hereinafter, may be abbreviated as an "ionic compound (b-2)"), there may be mentioned a Lewis acid, an ionic compound, a boran compound, a carborane compound and the like, which are described in Japanese Laid-Open Patent Publication No. H01-501950, Japanese Patent Laid-Open Publication No. H01-502036, Japanese Patent Laid-Open Publication No. H03-179005, Japanese Patent Laid-Open Publication No. H03-179006, Japanese Patent Laid-Open Publication No. H03-207703, Japanese Patent Laid-Open Publication No. H03-207704, U.S. Pat. No. 5,321,106 and the like. Further, as the ionic compound (b-2), there may be mentioned a heteropoly compound and an isopoly compound.

In the present invention, an ionic compound (b-2) which is preferably adopted is a compound represented by the following general formula [VI].

[Chemical Formula 5]

In the formula [VI], $R^{e+}$ includes $H^+$, a carbenium cation, an oxonium cation, an ammonium cation, a phosphonium cation, a cycloheptyltrienyl cation, a ferrocenium cation having a transition metal and the like. $R^f$ to $R^i$ may be the same or different from each other, and is an organic group and preferably an aryl group.

Specific examples of the carbenium cation include a trisubstituted carbenium cation such as a triphenylcarbenium cation, a tris(methylphenyl)carbenium cation, a tris(dimethylphenyl)carbenium cation and the like; and others.

Specific examples of the ammonium cation include a trialkylammonium cation such as a trimethylammonium cation, a triethylammonium cation, a tri(n-propyl)ammonium cation, a triisopropylammonium cation, a tri (n-butyl) ammonium cation, a triisobutylammonium cation and the like; an N,N-dialkylanilinium cation such as an N,N-dimethylanilinium cation, an N,N-diethylanilinium cation, an N,N-2,4,6-pentamethylanilinium cation and the like; a dialkylammonium cation such as a diisopropylammonium cation, a dicyclohexylammonium cation and the like; and others.

Specific examples of the phosphnium cation include a triarylphosphonium cation such as a triphenylphosphonium cation, a tris(methylphenyl)phosphonium cation, a tris(dimethylphenyl)phosphonium cation and the like; and others.

Among above, $R^{e+}$ is preferably a carbenium cation, an ammonium cation and the like and especially preferably a triphenylcarbenium cation, an N,N-dimethylanilinium cation and an N,N-diethylanilinium cation.

As the ionic compound (b-2) which is a carbenium salt, there may be specifically mentioned triphenyl carbenium tetrapheylborate, triphenyl carbenium tetrakis(pentafluorophenyl)borate, triphenyl carbenium tetrakis(3,5-ditrifluoromethylphenyl)borate, tris(4-methylphenyl) carbenium tetrakis(pentafluorophenyl)borate, tris(3,5-dimethylphenyl) carbenium tetrakis(pentafluorophenyl)borate and the like.

As the ionic compound (b-2) which is an ammonium salt, there may be mentioned a trialkyl-substituted ammonium salt, an N,N-dialkylanilinium salt, a dialkylammonium salt and the like.

As the ionic compound (b-2) which is a trialkyl-substituted ammonium salt, there may be specifically mentioned, for example, triethylammonium tetraphenyl borate, tripropylammonium tetraphenyl borate, tri(n-butyl)ammonium tetraphenyl borate, trimethylammonium tetrakis(p-tolyl)borate, trimethylammonium tetrakis(o-tolyl)borate, tri(n-butyl) ammonium tetrakis(pentafluorophenyl)borate, triethylammonium tetrakis(pentafluorophenyl)borate, tripropylammonium tetrakis(pentafluorophenyl)borate, tripropylammonium tetrakis(2,4-dimethylphenyl)borate, tri(n-butyl) ammonium tetrakis(3,5-dimethylphenyl)borate, tri(n-butyl) ammonium tetrakis(4-trifluoromethylphenyl)borate, tri(n-butyl)ammonium tetrakis(3,5-ditrifluoromethylphenyl)borate, tri(n-butyl)ammonium tetrakis(o-tolyl)borate, dioctadecyl methyl ammonium tetraphenylborate, dioctadecyl methyl ammonium tetrakis(p-tolyl)borate, dioctadecyl methyl ammonium tetrakis(o-tolyl)borate, dioctadecyl methyl ammonium tetrakis(pentafluorophenyl)borate, dioctadecyl methyl ammonium tetrakis(2,4-dimethylphenyl)borate, dioctadecyl methyl ammonium tetrakis(3,5-dimethylphenyl)borate, dioctadecyl methyl ammonium tetrakis(4-trifluoromethylphenyl)borate, dioctadecyl methyl ammonium tetrakis(3,5-ditrifluoromethylphenyl)borate, dioctadecyl methyl ammonium and the like.

As the ionic compound (b-2) which an N,N-dialkyl anilinium salt, there may be specifically mentioned, for example, N,N-dimethylanilinium tetraphenylborate, N,N-dimethylanilinium tetrakis(pentafluorophenyl)borate, N,N-dimethylanilinium tetrakis(3,5-ditrifluoromethylphenyl)borate, N,N-diethylanilinium tetraphenylborate, N,N-diethylanilinium tetrakis(pentafluorophenyl)borate, N,N-diethylanilinium tetrakis(3,5-ditrifluoromethylphenyl)borate, N,N-2,4,6-pentamethylanilinium tetraphenylborate, N,N-2,4,6-pentamethylanilinium tetrakis(pentafluorophenyl)borate and the like.

Specific examples of the dialkyl ammonium salt include, for example, di(1-propyl)ammonium tetrakis(pentafluorophenyl)borate, dicyclohexylammonium tetraphenylborate and the like.

As other ionic compounds (b-2), the ionic compounds disclosed by the present applicant (Japanese patent Laid-Open Publication No. 2004-51676) may be used without any restriction.

These ionic compounds (b-2) may be used alone or in a mixture of two or more kinds thereof.

Organoaluminum Compound (b-3)

The organoaluminum compound (b-3) includes, for example, an organoaluminum compound represented by the following general formula [VII], an alkylated complex of a metal of Group 1 of the Periodic Table and aluminum, which is represented by the following formula [VIII], and the like.

$$R^a_m Al(OR^b)_n H_p X_q \qquad [VII]$$

(In the formula [VII], $R^a$ and $R^b$ may be the same or different from each other and each represents a hydrocarbon group having 1 to 15 carbon atoms and preferably 1 to 4 carbon atoms, X represents a halogen atom, and m, n, p, and q are numbers satisfying the conditions: $0<m\leq3$, $0\leq n<3$, $0\leq p<3$, $0\leq q<3$, and $m+n+p+q=3$).

As the organoaluminium compound represented by the formula [VII], there may be specifically mentioned tri-n-alkylaluminum such as trimethylaluminum, triethylaluminum, tri-n-butylaluminum, trihexylaluminum, trioctylaluminum and the like; tri-branched-chain alkylaluminum such as tri-isopropylaluminum, tri-isobutyl aluminum, tri-sec-butylaluminum, tri-tert-butylaluminum, tri-2-methylbutyl aluminum, tri-3-methyl hexyl aluminum, tri-2-ethylhexylaluminum and the like; tri-cycloalkylaluminum such as tri-cyclohexylaluminum, tri-cyclooctylaluminum and the like; triarylaluminum such as triphenylaluminum, tritolyl aluminum and the like; dialkylaluminum hydride such as diisopropylaluminum hydride, diisobutylaluminum hydride and the like; alkenylaluminum, such as isoprenylaluminum, represented by the general formula: $(i-C_4H_9)_x Al_y (C_5H_{10})_z$ (wherein, x, y and z are positive integers, and z is the numbers satisfying the conditions: $z\leq 2x$) and the like; alkylaluminum alkoxide such as isobutylaluminum methoxide, isobutylaluminum ethoxide and the like; dialkylaluminum alkoxide such as dimethylaluminum methoxide, diethylaluminum ethoxide, dibutylaluminum butoxide and the like; alkylaluminum sesquialkoxide such as ethylaluminum sesquiethoxide, butylaluminum sesquibutoxide and the like; partially alkoxylated alkylaluminum having a mean compositions represented by the general formula such as $R^a_{2.5} Al (OR^b) 0.5$ and the like; alkylaluminum aryloxide such as diethylaluminum phenoxide, diethylaluminum (2,6-di-t-butyl-4-methylphenoxide) and the like; dialkylaluminum halide such as dimethylaluminum chloride, diethylaluminum chloride, dibutylaluminum chloride, diethylaluminum bromide, diisobutylaluminum chloride and the like; alkylaluminum sesquihalide such as ethylaluminum sesquichloride, butylaluminum sesquichloride, ethylaluminum sesquibromide and the like; partially halogenated alkylaluminum, for example, alkylaluminum dihalide such as ethylaluminum dichloride and the like; dialkylaluminum hydride such as diethylaluminum hydride, dibutylaluminum hydride and the like; other partially hydrogenated alkylaluminum, for example, alkylaluminum dihydrides such as ethylaluminum dihydride, propylaluminum dihydride and the like; partially alkoxylated and halogenated alkylaluminum such as ethylaluminum ethoxychloride, butylaluminum butoxychloride, ethylaluminum ethoxybromide and the like; and others.

$$M^2 Al R^a_4 \qquad [VIII]$$

An alkylated complex of a metal of Group 1 of the Periodic Table and aluminum, represented by the formula [VIII] (in the formula [VIII], $M^2$ represents Li, Na, or K, and $R^a$ represents a hydrocarbon group having 1 to 15 carbon atoms and preferably 1 to 4 carbon atoms). Such a compound may be exemplified by $LiAl(C_2H_5)_4$, $LiAl(C_7H_{15})_4$ and the like.

In addition, a compound similar to the compound represented by the formula [VII] may be used, for example, there may be mentioned an organoaluminum compound in which two or more aluminum compounds are bonded via a nitrogen atom. A specific example of such a compound includes $(C_2H_5)_2AlN(C_2H_5)Al(C_2H_5)_2$ and the like.

From the viewpoint of easy availability, as an organoaluminum compound (b-3), trimethylaluminum and tri-isobutyl aluminum are preferably used.

Production of Ethylenic Copolymer (A)

The ethylenic copolymer (A) of the present invention may be suitably produced by copolymerizing ethylene with at least one kind of α-olefin having 3 to 20 carbon atoms in the presence of the olefin polymerization catalyst. The polymerization is not particularly limited, but is preferably carried out by conducting solution polymerization at a temperature range of 0 to 200° C. in the presence of a solvent.

In the polymerization, the method for using each of the components and the sequence of addition are optionally selected. For example, a method in which the catalyst component (A) and the catalyst component (B) are added to a polymerization reactor in an arbitrary order may be mentioned.

In the method, two or more of the respective catalyst components may be brought into contact with each other in advance.

When the ethylenic copolymer (A) of the present invention is produced by copolymerization of ethylene and at least one-kind of α-olefin having 3 to 20 carbon atoms using the olefin polymerization catalyst as mentioned above, the catalyst component [A] is used in the amount in the range of usually $10^{-9}$ to $10^{-1}$ mol, preferably $10^{-8}$ to $10^{-2}$ mol per liter of reaction volume.

The component (b-1) is used in an amount so that the molar ratio [(b-1)/M] of the component (b-1) to all transition metal atoms (M) in the component (A) is usually 1 to 10000 and preferably 10 to 5000. The component (b-2) is used in an amount so that the molar ratio [(b-2)/M] of the component (b-2) to all transition metal atoms (M) in the component (A) is usually 0.5 to 50 and preferably 1 to 20. The component (b-3) is used in the amount in the range of usually from 0 to 5 mmol and preferably approximately from 0 to 2 mmol per liter of polymerization volume.

Here, the feeding molar ratio of ethylene to an α-olefin having 3 to 20 carbon atoms may be appropriately selected depending on the properties of the intended ethylenic copolymer (A) and is not particularly limited, but is usually from 10:90 to 99.9:0.1, preferably from 30:70 to 99.9:0.1 and more preferably from 50:50 to 95.0:5.0.

As the α-olefin having 3 to 20 carbon atoms, there may be mentioned a linear or branched α-olefin, for example, propylene, 1-butene, 2-butene, 1-pentene, 3-methyl-1-butene, 1-hexene, 4-methyl-1-pentene, 3-methyl-1-pentene, 1-octene, 1-decene, 1-dodecene and the like. Among these α-olefins, 1-butene, 1-hexene, 4-methyl-1-pentene and 1-octene are especially preferably used. In the present invention, among these α-olefins, an α-olefin having 3 to 10 carbon atoms is more preferably used.

The "solution polymerization", which is preferably employed for the production of the ethylenic copolymer (A), is generally referred to as a process of carrying out polymerization in a state in which a polymer is dissolved in a hydrocarbon solvent that is inert to the copolymerization reaction. In the solution polymerization according to the present invention, the polymerization temperature is usually from 0 to 200° C., preferably from 20 to 190° C. and more preferably from 40 to 180° C.

In the solution polymerization according to the present invention, when the polymerization temperature is less than 0° C., since the polymerization activity is extremely reduced, it is impractical in view of productivity and further the vinyl-group content of the ethylenic copolymer (A) may be decreased. In addition, in the polymerization temperature range of 0° C. or higher, as the temperature becomes higher, the solution viscosity during the polymerization is decreased and the removal of polymerization heat becomes easier and further the vinyl-group content of the ethylenic copolymer (A) is increased. However, if the polymerization temperature exceeds 200° C., the polymerization activity may be extremely reduced. The polymerization pressure is usually from normal pressure to 10 MPa gauge pressure, preferably normal pressure to 8 MPa gauge pressure, and the polymerization reaction may be carried out in any of batch, semi-continuous and continuous processes. The reaction time (when the copolymerization is carried out by a continuous process, mean retention time) varies depending on the conditions such as the catalyst concentration, polymerization temperature and the like and may be appropriately selected, but is usually from one minute to 3 hours, and preferably from 10 minutes to 2.5 hours. Further, the polymerization may be carried out at two or more stages which have different reaction conditions. The molecular weight of the resulting ethylenic copolymer (A) may be controlled by changing the hydrogen concentration or the polymerization temperature in the polymerization system, and moreover by the amount of the catalyst component (B) to be used. When hydrogen is added to the polymerization system, the amount is suitably approximately 0.001 to 5000 NL per 1 kg of the ethylenic copolymer to produce. In addition, the vinyl-group content of the resulting ethylenic copolymer (A) may be increased by increasing the polymerization temperature and by significantly reducing the hydrogen addition amount. Further, the ratio $MFR_{10}/MFR_{2.16}$ of the resulting ethylenic copolymer (A) becomes an index showing that the smaller the ratio is, the less the long-chain branched structure is. However, in the case of coordination polymerization as shown in the Examples described later, it is considered that the long-chain branched structure in the ethylenic copolymer (A) is generated by reinsertion of the molecular chain (macromonomer) having a terminal vinyl group generated by the β-dehydrogenation reaction. For this reason, the value of $MFR_{10}/MFR_{2.16}$ of the ethylenic copolymer (A) may be controlled by increasing or decreasing the ratio of the macromonomer concentration to the ethylene concentration ([macromonomer]/[ethylene]) in the solution. In general, if the ratio [macromonomer]/[ethylene] is high, the amount of long-chain branch in the ethylenic polymer is increased, and if the ratio [macromonomer]/[ethylene] is low, the amount of long-chain branch in the ethylenic polymer is decreased. As the technique of increasing or decreasing the ratio [macromonomer]/[ethylene] in the solution, the following methods [1] to [4] are mentioned.

[1] Polymerization Temperature

The lower the polymerization temperature is, the less the β-dehydrogenation reaction occurs. For this reason, if the polymerization temperature is decreased, the ratio [macromonomer]/[ethylene] becomes small and the amount of long-chain branch in the ethylenic copolymer is decreased.

[2] Polymer Concentration

If the polymer concentration in the solution is decreased, the macromonomer concentration is also relatively decreased and the ratio [macromonomer]/[ethylene] becomes small, and the amount of long-chain branch in the ethylenic copolymer is decreased.

[3] Ethylene Conversion Rate

If the ethylene conversion rate is decreased, the ethylene concentration in the solution is increased and the ratio [macromonomer]/[ethylene] becomes small, and the amount of long-chain branch in the ethylenic copolymer is decreased.

[4] Solvent Species

If a high boiling point solvent is used as a polymerization solvent, the ethylene concentration in the solution is increased and the ratio [macromonomer]/[ethylene] becomes small, and the amount of long-chain branch in the ethylenic copolymer is decreased.

In addition, the ratio [macromonomer]/[ethylene] may be increased or decreased and the amount of long-chain branch in the ethylenic polymer may be changed by controlling the chain transfer reaction to A1 except for controlling the β-dehydrogenation reaction.

The solvent used in the solution polymerization is usually an inert hydrocarbon solvent and preferably a saturated hydrocarbon solvent having a boiling point of 50 to 200° C. under normal pressure. Specific examples of the solvent include an aliphatic hydrocarbon such as pentane, hexane, heptane, octane, decane, dodecane, kerosene and the like; and an alicyclic hydrocarbon such as cyclopentane, cyclohexane, methylcyclopentane and the like. In the category of the "inert hydrocarbon solvents" relating to the high temperature solution polymerization of the present invention, aromatic hydrocarbons such as benzene, toluene, xylene and the like and a halogenated hydrocarbon such as ethylene chloride, chlorobenzene, dichloromethane and the like are also included, and the use of them is not limited. As described above, in the high temperature solution polymerization according to the present invention, an organoaluminum oxy compound of the aromatic hydrocarbon soluble type which has been generally conventionally used, as well as a modified methyl aluminoxane such as MMAO which is dissolved in aliphatic hydrocarbon and alicyclic hydrocarbon may be used. As a result, if the aliphatic hydrocarbon or the alicyclic hydrocarbon is used as a solvent for solution polymerization, it becomes capable of almost completely eliminating the probability that the aromatic hydrocarbon is mixed in the polymerization system or in the resulting ethylene polymer. That is, the high temperature solution polymerization method according to the present invention has characteristics capable of reducing the environmental burden and minimizing the impact on human health.

In order to suppress the variation of physical properties, the ethylenic copolymer obtained by the polymerization reaction and other components added if desired are preferably melted, kneaded and granulated by an arbitrary method.

Graft Modification

The ethylenic copolymer (A) of the present invention may be used after graft modifying part or whole thereof with a polar monomer.

The polar monomer includes a hydroxyl group-containing ethylenic unsaturated compound, an amino group-containing ethylenic unsaturated compound, an epoxy group-containing ethylenic unsaturated compound, an aromatic vinyl compound, an unsaturated carboxylic acid or its derivative, a vinyl ester compound, vinyl chloride, a carbodiimide compound and the like.

As the polar monomer, an unsaturated carboxylic acid or its derivative is especially preferred. As the unsaturated carboxylic acid or its derivative, there may be mentioned an unsaturated compound having one or more carboxylic groups, an ester of a compound having a carboxylic acid group and an alkyl alcohol, an unsaturated compound having one or more anhydrous carboxylic acid groups, and the like. The unsaturated group includes a vinyl group, a vinylene group, an unsaturated cyclic hydrocarbon group, and the like.

The specific compound includes, for example, an unsaturated carboxylic acid such as acrylic acid, maleic acid, fumaric acid, tetrahydrophthalic acid, itaconic acid, citraconic acid, crotonic acid, isocrotonic acid, najic acid (brand name) (endo-cis-bicyclo [2.2.1]hept-5-ene-2,3-dicarboxylic acid) and the like, or its derivative, for example, acid halide, amide, imide, anhydride, ester and the like. Specific examples of the derivative include, for example, malenyl chloride, maleimide, anhydrous maleic acid, anhydrous citraconic acid, monomethyl maleate, dimethyl maleate, glycidyl maleate and the like.

These unsaturated carboxylic acids and/or derivatives thereof may be used alone or in combination with two or more kinds. Among these, an unsaturated dicarboxylic acid or its acid anhydride is suitable and especially maleic acid, isocrotonic acid, najic acid, or an acid anhydride of them is preferably used.

Modification is achieved by graft polymerizing a polar monomer to a product to be modified. In graft polymerizing such a polar monomer to the product to be modified, the polar monomer is used in an amount of usually from 1 to 100 parts by weight and preferably from 5 to 80 parts by weight based on 100 parts by weight of the product to be modified. This graft polymerization is usually performed in the presence of a radical generator.

As the radical generator, for example, the same radical generators as those mentioned in the radical generator (c) described later are used.

The radical generator is used after directly mixing with the product to be modified and the polar monomer, but may be used after dissolving in a small amount of an organic solvent. This organic solvent is hot particularly limited for use, as long as it is an organic solvent capable of dissolving the radical generator.

In addition, in graft polymerizing a polar monomer to the product to be modified, a reducing substance may be used. If a reducing substance is used, the amount of the polar monomer to be grafted may be increased.

Graft modification of the product to be modified with a polar monomer may be performed by a conventionally well-known method.

The modified amount (the amount of the polar monomer to be grafted) of the modified product thus obtained is in the range of usually from 0.1 to 50% by weight, preferably from 0.2 to 30% by weight and more preferably from 0.2 to 10% by weight, based on 100% by weight of the modified product.

When the ethylenic copolymer (A) of the present invention is used after graft modifying part or whole thereof with a polar monomer, the resulting copolymer has excellent adhesiveness to other resins and excellent compatibility, and wettability on a surface of the resulting molded article may be improved.

Further, if the content of the polar monomer, for example, an unsaturated carboxylic acid and/or its derivative, is within the range, when the ethylenic copolymer (A) of the present invention is used after graft modifying part or whole thereof, the resulting copolymer has high adhesive strength to a polar group-containing resin (for example, polyester, polyvinylalcohol, ethylene-vinylalcohol copolymer, polyamide, PMMA, polycarbonate and the like).

In addition, other polymers, for example, a thermoplastic resin, an elastomer or the like may be blended, to a graft-modified ethylenic copolymer (A) obtained by graft modifying part or whole of the ethylenic copolymer (A) of the present invention, as long as the properties of the modified product are not impaired. They may be blended either in the graft-modifying stage or after the modifying.

The ethylenic copolymer (A) of the present invention is molded by various methods and is used for various applications.

<Ethylenic Copolymer Composition (1)>

The first ethylenic copolymer composition (ethylenic copolymer composition (1)) of the present invention contains the ethylenic copolymer (A) and an ethylene-polar monomer copolymer (B1) when needed.

<Ethylenic Copolymer (A)>

As the ethylenic copolymer (A), any of the ethylenic copolymers (A) of the present invention is suitably used.

As the ethylenic copolymer (A) constituting the ethylenic copolymer composition (1), among others, it is desirable to use an ethylenic copolymer (A) having the density of the requirement (c) of preferably from 0.857 to 0.910 g/cm$^3$ and more preferably from 0.860 to 0.905 g/cm$^3$. In addition, it is desirable that the ethylenic copolymer (A) has an ethylene content in the total constitutional units of usually from 50 to 95% by mole, preferably from 60 to 95% by mole, more preferably from 75 to 95% by mole and further more preferably from 80 to 95% by mole. Further, it is desirable that the ethylenic copolymer (A) has a molecular distribution (Mw/Mn) of preferably from 1.5 to 3.5 as measured values by GPC method. Still further, it is desirable that the ethylenic copolymer (A) has the MFR of the requirement (d) of preferably from 0.1 to 100 g/10 min, more preferably from 0.1 to 40 g/10 min, further more preferably from 0.1 to 25 g/10 min and especially preferably from 0.1 to 10 g/10 min.

Ethylene-Polar Monomer Copolymer (B1)

As the polar monomer of the ethylene-polar monomer copolymer (B1) constituting the ethylenic copolymer composition (1) of the present invention, there may be mentioned unsaturated carboxylic acid and its salt, ester, and amide, vinyl ester, carbon monoxide and the like. More specifically, there may be exemplified by one or two or more kinds of unsaturated carboxylic acids such as acrylic acid, methacrylic acid, fumaric acid, itaconic acid, monomethyl maleate, monoethyl maleate, maleic anhydride, itaconic anhydride and the like; salts of these unsaturated carboxylic acids, that is, a salt of monovalent metal such as lithium, sodium, potassium and the like or a salt of polyvalent metal such as magnesium, calcium, zinc and the like; unsaturated carboxylic acid esters such as methyl acrylate, ethyl acrylate, isopropyl acrylate, isobutyl acrylate, n-butyl acrylate, isoctyl acrylate, methyl methacrylate, ethyl methacrylate, isobutyl methacrylate, dimethyl maleate and the like; vinyl esters such as vinyl acetate and vinyl propionate; carbon monoxide; sulfur dioxide; and others.

As the ethylene-polar monomer copolymer (B1), there may be more specifically mentioned ethylene-unsaturated carboxylic acid copolymer such as ethylene-acrylic acid-copolymer and ethylene-methacrylic acid copolymer; ionomer in which part or whole of carboxyl group of the ethylene-unsaturated carboxylic acid copolymer is neutralized by the metal; ethylene-unsaturated carboxylic acid ester copolymer such as ethylene-methyl acrylate copolymer, ethylene-ethyl acrylate copolymer, ethylene-methyl methacrylate copolymer, ethylene-isobutyl acrylate copolymer and ethylene-n-butyl acrylate copolymer; ethylene-unsaturated carboxylic acid ester-unsaturated carboxylic acid copolymer such as ethylene-isobutyl acrylate-methacrylic acid copolymer and ethylene-n-butyl acrylate-methacrylic acid copolymer and ionomer in which part or whole of the carboxyl group is neutralized by the metal; ethylene-vinyl ester copolymer such as ethylene-vinyl acetate copolymer; and the like.

Among these, especially a copolymer of ethylene and a polar monomer selected from an unsaturated carboxylic acid and its salt and ester, and vinyl acetate are preferred. Especially an ethylene-(meth)acrylic acid copolymer or its ionomer, an ethylene-(meth)acrylic acid-(meth)acrylate ester copolymer or its ionomer, or an ethylene-vinyl acetate copolymer is preferred, and an ethylene-vinyl acetate copolymer is most preferred.

As the ethylene-polar monomer copolymer (B1), a copolymer which has a polar monomer content of usually from 1 to 50% by mass and especially preferably from 5 to 45% by mass is preferable, although the content varies depending on the kinds of a polar monomer. In view of mold processability, mechanical strength and the like, it is preferable for an ethylene-polar monomer copolymer to use at a melt flow rate from 0.05 to 500 g/10 min and especially from 0.1 to 100 g/10 min as measured at 190° C. under a load of 2160 g. The copolymers of ethylene with unsaturated carboxylic acids, unsaturated carboxylic acid esters, vinyl esters or the like are obtained by radical copolymerization under high temperature and high pressure conditions. In addition, the copolymers (ionomers) of ethylene with metal salts of unsaturated carboxylic acids are obtained by reacting ethylene-unsaturated carboxylic acid copolymers with the corresponding metal compounds.

When the ethylene-polar monomer copolymer (B1) according to the present invention is an ethylene-vinyl acetate copolymer, the content of vinyl acetate in the ethylene-vinyl acetate copolymer is usually from 10 to 30% by mass, preferably from 15 to 30% by mass and more preferably from 15 to 25% by mass. In addition, this ethylene-vinyl acetate copolymer has a melt flow rate (MFR; ASTM D1238, 190° C., load of 2.16 kg) of usually from 0.1 to 50 g/10 min, preferably from 0.5 to 20 g/10 min and more preferably from 0.5 to 5 g/10 min.

The ethylenic copolymer-composition (1) of the present invention contains the ethylenic copolymer (A) and the ethylene-polar monomer copolymer (B1) in a proportion of 100 to 20 parts by mass of (A) and 0 to 80 parts by mass of (B-1), and a preferred embodiment is that the ethylenic copolymer composition (1) contains 100 parts by mass of (A) and no (B1). In addition, when the ethylenic copolymer composition (1) contains (B1), it contains the ethylenic copolymer (A) and the ethylene-polar monomer copolymer (B1) in a proportion of 99 to 20 parts by mass of (A) and 1 to 80 parts by mass of (B1) (here, it is provided that the total of (A) and (B1) is 100 parts by mass). That is, in the ethylenic copolymer composition (1) of the present invention, a preferred embodiment is that the mass ratio ((A)/(B1)) of the ethylenic copolymer (A) to the ethylene-polar monomer copolymer (B1) is 100:0 to 20:80 and preferably 100:0. When the ethylenic copolymer composition (1) contains (B1), the mass ratio ((A)/(B1)) is in the range of preferably from 99:1 to 20:80 and more preferably from 99:1 to 40:60.

The ethylenic copolymer composition (1) of the present invention contains, as the polymer component, the ethylenic copolymer (A) and the ethylene-polar monomer copolymer (B1) if needed, but may contain other polymer components if needed. The other polymer components are not particularly -limited but include, for example, an ethylene-α-olefin-non-conjugated polyene copolymer and the like. When the ethylenic copolymer composition (1) contains a polymer other than the ethylenic copolymer (A) and the ethylene-polar monomer copolymer (B1), it is desirable that the content is usually 30 parts by mass or less and preferably approximately from 1 to 10 parts by mass, based on the total 100 parts by mass of (A) and (B1).

Radical Generator (C)

The ethylenic copolymer composition (1) of the present invention preferably contains a radical generator (C) which functions as a crosslinking agent.

When the ethylenic copolymer composition (1) contains the radical generator (C), the content is desired in the range of preferably from 0.1 to 2.0 parts by mass, more preferably from 0.1 to 1.5 parts by mass, further more preferably from 0.2 to 1.0 part by mass and especially preferably from 0.2 to 0.7 part by mass, based on the total 100 parts by mass of the ethylenic copolymer (A) and the ethylene-polar monomer copolymer (B1). If the ethylenic copolymer composition (1) containing a radical generator in the amount is used, a molded article or foamed molded article having a moderate crosslinking structure is produced.

As the radical generator (C), an organic peroxide is preferably used, and specifically includes an organic peroxide such as dicumylperoxide, di-t-butylperoxide, 2,5-dimethyl-2,5-di-(t-butylperoxy)hexane, 2,5-dimethyl-2,5-di-(t-butylperoxy)hexine-3, 1,3-bis(t-butylperoxyisopropyl)benzene, 1,1-bis(t-butylperoxy)-3,3,5-trimethylcyclohexane, n-butyl-4,4-bis(t-butylperoxy)varelate, benzoyl peroxide, p-chlorobenzoyl peroxide, 2,4-dichlorobenzoyl peroxide, t-butylperoxy benzoate, t-butylperbenzoate, t-butylperoxyisopropyl carbonate, diacetylperoxide, lauroylperoxide, t-butylcumylperoxide and the like. Among these, dicumylperoxide is preferred.

When the ethylenic copolymer composition (1) of the present invention contains the radical generator (C), it also preferably contains an auxiliary crosslinking agent if needed, together with the radical generator (C). The auxiliary crosslinking agent includes, for example, a peroxy crosslinking auxiliary such as sulfur, p-quinonedioxime, p,p'-dibenzoylquinoneoxime, N-methyl-N-4-dinitrosoaniline, nitrosobenzene, diphenylguanidine, trimethylolpropane-N, N'-m-phenylene dimaleimide; or divinylbenzene, triallylcyanurate (TAC) and triallylisocyanurate (TAIC).

In addition, there may be mentioned a multifunctional methacrylate monomer such as ethylene glycol dimethacrylate, diethylene glycol dimethacrylate, polyethylene glycol dimethacrylate, trimethylolpropane trimethacrylate, allyl methacrylate and the like; a multifunctional vinyl monomer such as vinyl butyrate, vinyl stearate; and the like. Among these, triallylcyanurate (TAC) and triallylisocyanurate (TAIC) are preferred.

In the ethylenic copolymer composition (1) of the present invention, such an auxiliary crosslinking agent is desired to be used in an amount so that the mass ratio [auxiliary crosslinking agent/radical generator (C)] of the auxiliary crosslinking agent to the radical generator (C) is from 1:30 to 5:1, preferably from 1:20 to 3:1, more preferably from 1:15 to 2:1, and especially preferably from 1:10 to 1:1.

Foaming Agent (D)

The ethylenic copolymer composition (1) of the present invention preferably contains a foaming agent (D).

When the ethylenic copolymer composition (1) contains a foaming agent (D), the content varies depending on the types of the foaming agent (D), but is desired in the range from 0.1 to 30 parts by mass, preferably from 0.1 to 25 parts by mass and more preferably from 0.5 to 20 parts by mass, based on the total 100 parts by mass of the ethylenic copolymer (A) and the ethylene-polar monomer copolymer (B1).

In the present invention, as the foaming agent (D), any of a chemical foaming agent and a physical foaming agent may be used.

The chemical foaming agent specifically includes an azo compound such as azodicarbonamide (ADCA), 1,1'-azobis(1-acetoxy-1-phenylethane), dimethyl-2,2'-azobisbutylate, dimethyl-2,2'-azobisisobutylate, 2,2'-azobis(2,4-trimethylpentane), 1,1'-azobis(cyclohexane-1-carbonitrile), 2,2'-azobis[N-(2-carboxyethyl)-2-methyl-propioneamidine] and the like;

a nitroso compound such as N,N'-dinitrosopentamethylene tetramine (DPT) and the like;

a hydrazine derivative such as 4,4'-oxybis(benzene-sulfonylhydrazide), diphenylsulfone-3,3'-disulfonylhydrazide and the like;

a semicarbazide compound such as p-toluenesulfonyl semicarbazide and the like;

an organic thermally decomposable foaming agent such as trihydrazinotriazine and the like;

a bicarbonate salt such as sodium hydrogen carbonate, ammonium hydrogen carbonate and the like; a carbonate salt such as sodium carbonate, ammonium carbonate and the like;

a nitrite salt such as ammonium nitrite and the like; and an inorganic thermally decomposable foaming agent such as a hydrogen compound and the like. Among these, azodicarbonamide (ADCA) and sodium hydrogen carbonate are particularly preferred.

As the physical foaming agent, which is a foaming agent that is not necessarily accompanied by chemical reactions upon foaming, there may be mentioned, for example, organic physical foaming agents including various kinds of aliphatic hydrocarbons such as methanol, ethanol, propane, butane, pentane, hexane and the like; various kinds of chlorinated hydrocarbons such as dichloroethane, dichloromethane, carbon tetrachloride and the like; various kinds of fluorochlorohydrocarbons such as chlorofluorocarbon and the like; also, inorganic physical foaming agents such as air, carbon dioxide, nitrogen, argon, water and the like; and others. Among these, carbon dioxide, nitrogen and argon are the most excellent because they are not required to be turned into vapor, inexpensive and unlikely to cause environmental pollution and ignition.

If the physical foaming agent is used as the foaming agent (D) in the present invention, it leaves no decomposition residue and thus may prevent the mold from contaminating during the crosslinking foaming process of the composition. Moreover, since the physical foaming agent is not powdery, it is excellent in kneadability. In addition, if the physical foaming agent is used, abnormal odor of the resulting foamed product (for example, ammonia odor generated upon decomposition of ADCA) may be prevented from generating.

Further, in the present invention, the chemical foaming agent may be used as the foaming agent (D) as long as it causes no adverse effect such as odor, mold contamination and the like. These chemical foaming agents may be used alone or in combination with two or more kinds, or in combination with a physical foaming agent and a chemical foaming agent.

As the storing method of the physical foaming agent, in the case of small-scale production, carbon dioxide, nitrogen and the like may be used in a state where they are stored in a steel bottle and supplied to an injection molding machine, an extrusion molding machine and the like through a pressure reducing valve, or may be pressurized by a pump and the like and to supply to an injection molding machine, an extrusion molding machine and the like.

In addition, in the case of a facility producing a foamed product on a large scale, liquefied carbon dioxide, liquefied nitrogen and the like are stored in a storage tank, vaporized by passing through a heat exchanger and supplied to an injection molding machine, an extrusion molding machine and the like through piping and a pressure reducing valve.

Further, in the case of a physical foaming agent in a liquid state, the storage pressure is preferably in the range of from 0.13 to 100 MPa.

When a chemical foaming agent is used as the foaming agent (D), the chemical foaming agent is used in a proportion of usually from 2 to 30 parts by mass, preferably 3 to 20 parts by mass and more preferably from 5 to 15 parts by mass, based on the total 100 parts by mass of the ethylenic copolymer (A) and the ethylene-polar monomer copolymer (B1). However, the addition amount of the chemical foaming agent may be appropriately increased or -decreased by the intended expansion ratio because the gas volume generated varies depending on the types and grades of the foaming agent used.

Further, when a physical foaming agent is used as the foaming agent (D), the addition amount of the physical foaming agent is appropriately determined depending on the intended expansion ratios, but is in the range of usually from 0.1 to 15 parts by mass and preferably from 0.5 to 10 parts by mass, based on the total 100 parts by mass of the ethylenic copolymer (A) and the ethylene-polar monomer copolymer (B1).

The ethylenic copolymer composition (1) of the present invention may contain an auxiliary foaming agent if needed, together with the foaming agent (D). The auxiliary foaming agent has functions of lowering the decomposition temperature of the foaming agent (D), accelerating the decomposition, making bubbles uniform, and the like. Such an auxiliary foaming agent includes zinc oxide (ZnO); zinc stearate; an organic acid such as salicylic acid, phthalic acid, stearic acid, oxalic acid and the like; urea or its derivative; and others.

Optional Component

The ethylenic copolymer composition (1) of the present invention may contain various kinds of additives such as filler, heat stabilizer, weather stabilizer, flame retardant, hydrochloric acid absorbent, pigment and the like, if needed. The various kinds of additives include those which are well known as additives capable being added to an olefinic resin.

The ethylenic copolymer composition (1) of the present invention may be suitably used for various applications, especially for the application of the foaming molding process.

<Production of Foamed Molded Article>

A foamed molded article of the present invention may be produced by subjecting the ethylenic copolymer composition (1) to foaming molding, and preferably, may be produced by subjecting an ethylenic copolymer composition (1) containing the radical generator (C) and the foaming agent (D) to crosslinking foaming molding.

The ethylenic copolymer composition (1) used for producing a foamed molded article is in an non-crosslinked and unfoamed state and may be in a melted state or may be a pellet or sheet which is cooled and solidified.

When the foamed molded article is produced by using a pellet of the ethylenic copolymer composition (1), the pellet is prepared using a granulator by mixing the ethylenic copolymer (A) and ethylene-polar monomer copolymer (B1), as well as each of a component such as the radical generator (C), the foaming agent (D), other additives and the like in the proportion with the use of a Henschel mixer; melting and plasticizing the mixture with the use of a kneader such as a Banbury mixer, a roller, an extruder and the like at a temperature where the radical generator (C) and/or the foaming agent (D) may not be decomposed; and homogeneously mixing and dispersing the resulting mixture.

As the method for producing a foamed molded article by crosslinking foaming, there may be mentioned, for example, crosslinking by heat treatment and ionizing radiation crosslinking. In the case of the crosslinking by heat treatment, the ethylenic copolymer composition (1) preferably contains the radical generator (C) and the auxiliary crosslinking agent. In addition, in the case of the ionizing radiation crosslinking, the ethylenic copolymer composition (1) preferably contains the auxiliary crosslinking agent.

A foamed molded article of the present invention may contain various kinds of additives such as filler, heat stabilizer, weather stabilizer, flame retardant, hydrochloric acid absorbent, pigment and the like, if needed, as long as the objects of the invention are not impaired. These additives may be contained in the ethylenic copolymer composition (1) in advance, and may be added and used during the production of the foamed molded article.

In addition, when the foamed molded article is produced using a sheet of the ethylenic copolymer composition (1), the sheet may be prepared, for example, by feeding the pellet obtained as mentioned above to an extruder or a calendar molding machine. Further, an expandable sheet in a non-crosslinked and unfoamed state may be prepared by a method in which each of the components constituting the ethylenic copolymer composition (1) are kneaded by a blender and the like, and then the resultant is molded into a sheet by a calendar roll or is made into a sheet by a press molding machine, or by a method in which the pellet is kneaded by an extruder, and then the resultant is made into a sheet by passing through a T-die or a cyclic die.

The foamed molded article of the present invention may be non-crosslinked or crosslinked and the production method is not particularly limited, but it may be produced, for example, by the following methods.

For example, when the foamed molded article is produced using the expandable sheet, a sheet of the ethylenic copolymer composition (1) obtained as mentioned above may be obtained using a calendar molding machine, a press molding machine or a T-die extruder. Preferably, a sheet of the ethylenic copolymer composition (1) may be obtained using a calendar molding machine, a press molding machine or a T-die extruder. During the molding of the sheet, when the ethylenic copolymer composition (1) contains the radical generator (C) and the foaming agent (D), the sheet is preferably molded at their decomposition temperature or less, and specifically, the sheet is preferably molded by setting the condition that the temperature at which the components constituting the ethylenic copolymer composition (1) is in a melted state, is 100 to 130° C., for example.

In exemplifying a method for producing a primary foamed product from the sheet obtained by the method, for example, the sheet is cut into a volume of 1.0 to 1.2 times the volume of a mold, and placed in the mold maintained at 130 to 200° C. A primary foamed product (non-crosslinked or crosslinked foamed product) is produced under the conditions that the mold clamping pressure is, for example, 30 to 300 kgf/cm$^2$ and the holding time is 10 to 90 minutes. That is, a foamed molded article (non-crosslinked or crosslinked foamed product) is produced by heat treatment. In addition, the holding time may be increased or decreased accordingly beyond the range because it is dependent on the thickness of the mold.

A mold for the (crosslinked) foamed product is not particularly limited in shape, but a mold having a shape suitable for producing sheets is usually used. This mold preferably has a completely closed structure so that the melted resin and the gas generated during the decomposition of the foaming agent may not escape. Further, the mold form preferably has a taper on the inner surface from the viewpoint of the releasability of the resin.

In addition to the methods, the foamed molded article of the present invention may be produced by an extrusion foaming method in which for example, the ethylenic copolymer composition (1) is extruded from an extruder and is foamed simultaneously when it is opened into the atmosphere. That is, a foamed product may be produced by heat treatment.

Further, there may be mentioned a method (injection foaming method) of injecting the ethylenic copolymer composition (1), preferably an ethylenic copolymer composition (1) containing the radical foaming agent (C) and the foaming agent (D) into a mold at the decomposition temperature or less of the radical generator (C) and the foaming agent (D), and maintaining at a temperature, for example, of approximately from 130 to 200° C. in the mold and crosslinking foaming of the resulting mixture. That is, a foamed product may be produced by heat treatment.

It is also preferable that a predetermined shape is given to the primary foamed product obtained by the method by compression molding. The compression molding conditions at this time are such that the mold temperature is in the range of 130 to 200° C., the clamping pressure is in the range of 30 to 300 kgf/cm$^2$, the compression time is in the range of 5 to 60 minutes and the compression ratio is in the range of 1.1 to 3.0 and preferably 1.3 to 2.

In addition, in order to obtain a crosslinked foamed product by a crosslinking method by ionizing irradiation, first, the ethylenic copolymer composition (1), preferably an ethylenic copolymer composition (1) containing an organic thermally decomposable foaming agent is melt-kneaded at a temperature lower than the decomposition temperature of the foaming agent (D), and the resulting kneaded product is molded into a sheet shape to obtain a foamed sheet.

Next, the resulting foamed sheet is irradiated with a predetermined dose of ionizing radiation to crosslink, and then the resulting crosslinked foamed sheet is heated at the decomposition temperature or higher of the organic thermally decomposable foaming agent to obtain a crosslinked foamed product in a sheet state. That is, a foamed product may be produced by heat treatment.

As the ionizing radiation, an α-ray, β-ray, γ-ray, electron beam, neutron beam, X-ray or the like are used. Among these, the γ-ray of cobalt-60 and the electron beam are preferably used.

The product shape of the foamed product includes, for example, a sheet shape, a thick board shape, a net shape, a molded shape and the like.

A secondary foamed product may be produced by giving a predetermined shape to the crosslinked foamed product obtained as mentioned above by compression molding. An example of the compression molding conditions at this time is that the mold temperature is in the range of 130 to 200° C., the clamping pressure is in the range of 30 to 300 kgf/cm$^2$, the compression time is in the range of 5 to 60 minutes and the compression ratio is in the range of 1.1 to 3.0.

Among the production methods above, a foamed molded article is preferably obtained by heat treating the ethylenic copolymer composition (1) or preferably an ethylenic copolymer composition (1) containing the radical generator (C) and the foaming agent (D).

Further, a foamed molded article of the present invention preferably has a specific gravity of 0.03 to 0.30. In addition, the compression set (CS, %) and specific gravity (d) of the foamed molded article of the present invention are not particularly limited, but preferably satisfy the requirement, $CS \leq -279 \times (d) + 95$ in view of capable of providing a foamed molded article which is light weight and has a small compression set. Since such a foamed molded article has a good stress relaxation for compression and is suitable for the application requiring sag resistance, it is preferably used for the laminated product, footwears or footwear parts which are described later. Further, the lower limit of the CS value is not particularly limited, but for example, a preferred embodiment is that the CS value is 10% or more and preferably 25% or more.

<Laminated Product and Footwear Part>

The foamed molded article of the present invention is also preferably a laminated product in which the foamed molded article is laminated with other raw materials or the foamed molded articles of the present invention are laminated with each other. The foamed molded article of the present invention, which is a laminated product, is preferably a laminated product having a layer composed of the foamed molded article (non-crosslinked or crosslinked foamed product) of the present invention and a layer composed of at least one material selected from the group consisting of polyolefin, polyurethane, rubber, leather and artificial leather, which are described above.

As the other material constituting a laminated product, preferably one kind of material selected from the group consisting of polyolefin, polyurethane, rubber, leather and artificial leather, a well-known one may be used without any particular limitation. Such a laminated product is especially suitable for footwear parts.

The footwear parts includes, for example, shoe soles, midsoles, innersoles, soles, sandals and the like.

Since the footwears and footwear parts according to the present invention use the foamed molded article of the present invention or the foamed molded article of the present invention which is a laminated product, they are lightweight and may suppress the deformation caused by long-term use. For this reason, the foamed molded article of the present invention which is a footwear part is especially useful for sports shoes.

<Ethylenic Copolymer Composition (2)>

A second ethylenic copolymer composition (ethylenic copolymer composition (2)) of the present invention contains the ethylenic copolymer (A) and an ethylene-α-olefin having 3 to 20 carbon atoms-non-conjugated polyene copolymer (B2).

Ethylenic Copolymer (A)

As the ethylenic copolymer (A), any of the ethylenic copolymers (A) of the present invention is suitably used.

As the ethylenic copolymer (A) constituting the ethylenic copolymer composition (2), among the copolymers, one in which the density of the requirement (c) is preferably from 0.855 to 0.910 g/cm$^3$, more preferably from 0.855 to 0.900 g/cm$^3$ and further more preferably from 0.857 to 0.890 g/cm$^3$ is desirably used. In addition, it is desirable that the ethylenic copolymer (A) has an ethylene content in the total constitutional units of usually from 50 to 95% by mole, preferably from 60 to 95% by mole, more preferably from 75 to 95% by mole and further more preferably from 80 to 95% by mole. Further, it is desirable that the ethylenic copolymer (A) has a molecular distribution (Mw/Mn) of preferably from 1.5 to 3.5 and more preferably from 1.5 to 3.0 as measured values by GPC method. Still further, it is desirable that the MFR of the requirement (d) is preferably from 0.1 to 100 g/10 min, more preferably from 0.1 to 40 g/10 min, more preferably from 0.1 to 25 g/10 min and especially preferably from 0.1 to 10 g/10 min.

Ethylene-α-Olefin Having 3 to 20 Carbon Atoms-Non-Conjugated Polyene Copolymer (B2)

The ethylene-α-olefin having 3 to 20 carbon atoms-non-conjugated polyene copolymer (B2), which constitutes the ethylenic copolymer composition (2) of the present invention, is an amorphous or low crystalline, random elastic copolymer rubber containing ethylene, an α-olefin having 3 to 20 carbon atoms and a non-conjugated polyene as a constitutional component. As the component (B2), one having a degree of crystallinity of usually less than 10% as measured by a well-known wide-angle X-ray diffraction method is used. The constitutional unit derived from ethylene of the (B2) is usually from 50 to 85% by mole, preferably from 55 to 80% by mole and more preferably from 60 to 80% by mole. (Here, it is provided that the total of the constitutional unit derived from ethylene, the constitutional unit derived from α-olefin having 3 to 20 carbon atoms and the constitutional unit derived from non-conjugated polyene is 100% by mole.) The molar ratio of ethylene to α-olefin of the component (B2) is not particularly limited and for example, is in the range of usually from 55:45 to 85:15 and especially preferably from 60:40 to 83:17.

As the α-olefin having 3 to 20 carbon atoms, there may be mentioned a linear or branched α-olefin, for example, propylene, 1-butene, 2-butene, 1-pentene, 3-methyl-1-butene, 1-hexene, 4-methyl-1-pentene, 3-methyl-1-pentene, 1-octene, 1-decene, 1-dodecene and the like. Among these α-olefins, 1-butene, 1-hexene, 4-methyl-1-pentene and 1-octene are especially preferably used. In the present invention, among these α-olefins, an α-olefin having 3 to 10 carbon atoms is more preferably used.

As the non-conjugated polyene, there may be specifically mentioned dicyclopentadiene, 1,4-hexadine, cyclooctadiene, methylenenorbornene, ethylidenenorbornene, vinylnorbornene and the like. In the component (B2), the content of the constitutional unit derived from non-conjugated polyene is 0.01 to 30% by mole, preferably 0.1 to 20% by mole and more preferably 0.1 to 10% by mole. Here, it is provided that the total of the constitutional unit derived from ethylene, the constitutional unit derived from α-olefin having 3 to 20 carbon atoms and the constitutional unit derived from non-conjugated polyene is 100% by mole.

As the component (B2) according to the present invention, among these, an ethylene-propylene-non-conjugated diene copolymer rubber and an ethylene-1-butene-non-conjugated diene copolymer rubber are preferred, and an ethylene-propylene non-conjugated diene copolymer rubber, above all, an ethylene-propylene-ethylidenenorbornene copolymer rubber and an ethylene-propylene-vinylnorbornene copolymer rubber are especially preferred, because the ethylenic copolymer composition (2) may form a moderate crosslinking structure if they are used. As the component (B2) used in the present invention, an ethylene-propylene-ethylidenenorbornene copolymer rubber is especially preferred.

In the present invention, the non-conjugated polyene as described above, for example, a non-cnjugated diene may be used alone or in a mixture of two or more kinds thereof. Further, other copolymerizable monomers may be used in addition to the non-conjugated polyene described above, as long as the object of the present invention is not impaired.

In the present invention, the content of the non-conjugated diene constituting the component (B2) is in the range from 0.01 to 30% by mole, preferably from 0.1 to 20% by mole and particularly preferably from 0.1 to 10% by mole.

As the component (B2) used in the present invention, there may be mentioned, for example, an ethylene-α-olefin having 3 to 20 carbon atoms-non-conjugated polyene copolymer in which the molar ratio of ethylene to an α-olefin having 3 or more carbon atoms, which is the ratio of ethylene to an α-olefin having 3 or more carbon atoms, is 40:60 to 95:5.

The component (B2) used in the present invention has an intrinsic viscosity [η] in the range of usually from 1.0 to 10.0 dl/g and preferably from 1.5 to 7 dl/g, as measured at 135° C. in a decalin solvent. In addition, the component (B2) used in the present invention is not particularly limited, but preferably has a melting point (Tm) of less than 120° C. or no melting point (Tm) determined from an endothermic curve of DSC.

The component (B2) used in the present invention has a Mooney viscosity ($ML_{1+4}$) at 100° C. in the range of preferably from 10 to 300 and more preferably from 10 to 200.

In addition, the component (B2) has an iodine value in the range of preferably from 3 to 30 and especially preferably from 5 to 25. If the component (B2) has an iodine value within the range, it is preferable because the ethylenic copolymer composition (2) is crosslinked in a balanced manner and becomes excellent in moldability and rubber elasticity.

In the present invention, the component (B2) is obtained, for example, by copolymerizing ethylene, an α-olefin having 3 to 20 carbon atoms and a non-conjugated polyene in the presence of an olefin polymerization catalyst. The α-olefin and non-conjugated polyene constituting the component (B2) may be used alone or in combination with two or more kinds of them.

In the ethylenic copolymer composition (2) of the present invention, a softening agent may be further blended. A composition excellent in flexibility and moldability may be obtained by using a softening agent.

Such a softening agent specifically includes a petroleum-type substance such as process oil, lubricating oil, paraffin, liquid paraffin, petroleum asphalt, vaseline and the like; coal tars such as coal tar, coal tar pitch and the like; a fatty oil such as castor oil, linseed oil, rapeseed oil, soybean oil, coconut oil and the like; waxes such as tall oil, bees wax, carnauba wax, lanolin and the like; a fatty acid or a metal salt thereof such as ricinoleic acid, palmitic acid, stearic acid, barium stearate, calcium stearate and the like; a synthetic high molecular substance such as petroleum resin, coumarone-indene resin, atactic polypropylene and the like; an ester-type plasticizer such as dioctyl phthalate, dioctyl adipate, dioctyl sebacate and the like; microcrystalline wax, substitute (factice), liquid polybutadiene, modified liquid polybutadiene, liquid Thiokol and others.

Among these softening agents, a paraffin-type process oil is especially preferred, and further, a paraffinic process oil of high viscosity type having a less content of easily volatile low molecular weight components is especially preferred. Here, the term high viscosity type means that the kinetic viscosity at 40° C. is in the range from 100 to 1000 centistokes.

In the ethylenic copolymer composition (2) of the present invention, the softening agent is used in a proportion of 150 parts by mass or less, preferably from 2 to 100 parts by mass and more preferably from 5 to 60 parts by mass, based on 100 parts by mass of the ethylene-α-olefin having 3 to 20 carbon atoms-non-conjugated polyene copolymer (B2). The softening agent may be added, as an oil-extended rubber, in a form in which it is mixed together with the (B2) in advance, or may be added later.

The ethylenic copolymer composition (2) of the present invention desirably contains the ethylenic copolymer (A) and the ethylene-α-olefin having 3 to 20 carbon atoms-non-conjugated polyene copolymer (B2) in a proportion of 100 to 31 parts by mass of (A) and 0 to 69 parts by mass of (B2), preferably in a proportion of 90 to 35 parts by mass of (A) and 10 to 65 parts by mass of (B2), and more preferably in a proportion of 90 to 40 parts by mass of (A) and 10 to 60 parts by mass of (B2), based on the total 100 parts by mass of the component (A) and component (B2). If the component (A) and component (B2) are used in the proportion, an ethylenic copolymer composition (2) excellent in heat resistance, flexibility, rubber elasticity and molding precessability is obtained.

The ethylenic copolymer composition (2) of the present invention may contain a resin component other than the component (A) and component (B2), preferably a rubber component, as long as the object of the present invention is not impaired. Such other rubber component includes, for example, a styrene-butadiene rubber and a hydrogenated product thereof, a styrene-isoprene rubber and a hydrogenated product thereof, a polybutadiene rubber, a polyisoprene rubber, a nitrile rubber, a butyl rubber, a polyisobutylene rubber, a natural rubber, a silicone rubber and the like. When the ethylenic copolymer composition (2) of the present invention contains other rubber component other than the component (B2), the content of the other rubber component is usually 100 parts by mass or less and preferably 50 parts by mass or less, based on 100 parts by mass of the component (B2).

Inorganic Filler

The ethylenic copolymer composition (2) of the present invention preferably contains an inorganic filler. When the ethylenic copolymer composition (2) contains an inorganic filler, the content is usually from 1 to 250 parts by mass, preferably from 10 to 250 parts by mass and more preferably from 30 to 250 parts by mass, based on the total 100 parts by mass of the component (A) and component (B2).

The inorganic filler is not particularly limited but includes metal hydroxide, natural silicic acid or natural silicate, carbonate, sulfate, oxide, synthetic silicic acid or synthetic silicate and the like.

The metal hydroxide includes aluminum hydroxide, magnesium hydroxide and the like. The natural silicic acid or natural silicate includes talc, powdery talc, kaolinite, sintered clay, mica, pyrophyllite, sericite, wollastonite and the like. The carbonate includes calcium carbonate, precipitated calcium carbonate, calcium bicarbonate, magnesium carbonate and the like. The sulfate includes barium sulfate, magnesium sulfate and the like. The oxide includes zinc oxide, flower of zinc, magnesium oxide, antimony oxide and the like. The synthetic silicic acid or synthetic silicate includes hydrated calcium silicate, hydrated aluminum silicate, hydrated silicic acid, anhydrous silicic acid and the like.

In addition, the inorganic filler may be an inorganic flame retardant, and the inorganic flame retardant includes a well-known flame retardant such as an antimony flame retardant (for example, antimony trioxide), a metal hydroxide flame retardant (for example, magnesium hydroxide) and the like.

The ethylenic copolymer composition (2) of the present invention may contain a single kind of the inorganic filler or two or more kinds of the inorganic fillers in combination. As the inorganic filler, among these, the metal hydroxide is especially preferably used.

Radical Generator (C)

The ethylenic copolymer composition (2) of the present invention may contain a radical generator (C). When the ethylenic copolymer composition (2) contains the generator (C), the content is in the range of preferably from 0.1 to 15 parts by mass and more preferably from 0.1 to 10 parts by mass based on the total 100 parts by mass of the component (A) and component (B). As the radical generator (C), any of the radical generators described in the ethylenic copolymer composition (1) may be used, among which an organic peroxide is more preferably used.

In the ethylenic copolymer composition (2), a auxiliary crosslinking agent may or may not be used together with the radical generator (C). As the auxiliary crosslinking agent, for example, the auxiliary crosslinking agents described in the ethylenic copolymer composition (1) may be mentioned.

The ethylenic copolymer composition (2) of the present invention may contain the other resin components as mentioned above and additives if needed, in addition to the components as described above. As the additives, various kinds of additives capable of adding to an olefinic resin may be used and for example, antioxidant, ultraviolet absorber, weather stabilizer, heat stabilizer, antistatic agent, flame retardant, pigment, dye, lubricant and the like are mentioned. In addition, the ethylenic copolymer composition (2) may contain a triazine ring-containing compound and powdery silicone (also referred to as silicone powder), which are generally known as a flame retardant, and preferably contains a borate compound, more preferably zinc borate as an auxiliary flame retardant.

The ethylenic copolymer composition (2) according to the present invention is prepared by melt-blending each component constituting the ethylenic copolymer composition (2) by various conventionally well-known methods.

For example, the ethylenic copolymer composition (2) according to the present invention is obtained by feeding each component described above simultaneously or sequentially into, for example, a Henschel mixer, V-type blender, tumbler mixer, ribbon blender or the like to mix, and then by melt-kneading the resulting mixture by a single-screw extruder, multi-screw extruder, kneader, Banbury mixer or the like.

Among these, when an apparatus having excellent kneading performance such as a multi-screw extruder, a kneader, a Banbury mixer and the like is used, a high-quality polymer composition in which each component is dispersed more uniformly is obtained.

Further, the additives, for example, an antioxidant and the like may be added if necessary in an arbitrary stage.

The ethylenic resin composition (2) according to the present invention has excellent crosslinking properties and excellent flexibility and is more excellent in elongation properties and hue than a common single EPDM, because the ethylenic copolymer (A), which is a component of the ethylenic copolymer composition (2), contains a relatively large number of vinyl groups. For this reason, if the ethylenic resin composition (2) according to the present invention is used, a molded article which is not so inferior in hue, has improved crosslinking properties and is excellent in heat resistance and strength may be produced, compared to a composition of a conventional ethylene-α-olefin copolymer and EPDM. Further, when properties equivalent to the composition of a conventional ethylene-α-olefin copolymer and EPDM are required, the amount of the radical generator to be blended may be reduced, which is economical.

The ethylenic resin composition (2) of the present invention may be used for various applications, but especially may be suitably used for electric wire coating and is useful as an electric wire coating material and an electric wire sheath.

The ethylenic resin composition (2) of the present invention may be molded by a well-known method. A molded article according to the present invention may be produced by molding the ethylenic resin composition (2) of the present invention into various shapes by a conventionally well-known melt-molding method, for example, a method such as extrusion molding, rotation molding, calendaring molding, injection molding, compression molding, transferring molding, powder molding, blow molding, vacuum molding and the like. The molded article of the present invention thus obtained is preferably crosslinked during and/or after the molding. The crosslinking method is not particularly limited but preferably includes thermal crosslinking.

A molded article of the present invention may be suitably used for the application of an electric wire coating such as an electric wire sheath, an electric wire insulator and the like. In addition, a molded article according to the present invention is a coating layer such as an electric wire sheath, an electric wire insulator and the like. The coating layer such a the electric wire sheath, the electric wire insulator and the like may be formed on the periphery of an electric wire by a conventionally well-known method, for example, extrusion molding and the like. Further, an electric wire of the present invention is provided with a molded article formed by the ethylenic resin composition (2) of the present invention as an electric wire coating layer such as an electric wire coating material, an electric wire sheath and/or the like.

<Thermoplastic Elastomer>

A thermoplastic elastomer of the present invention is obtained by dynamically crosslinking a mixture containing the ethylenic copolymer (A) and a crystalline propylenic polymer (B3).

Ethylenic Copolymer (A)

As the ethylenic copolymer (A), any of the ethylenic copolymers (A) of the present invention is suitably used.

As the ethylenic copolymer (A) constituting the thermoplastic elastomer of the present invention, among others, one in which the density of the requirement (c) is preferably from 0.855 to 0.910 g/cm$^3$, more preferably from 0.857 to 0.910 g/cm$^3$ and further more preferably from 0.860 to 0.910 g/cm$^3$ is preferably used. In addition, it is desirable that the ethylenic copolymer (A) has an ethylene content in the total constitutional units of usually from 50 to 95% by mole, preferably from 60 to 95% by mole, more preferably from 75 to 95% by mole and further more preferably from 80 to 95% by mole. Further, it is desirable that the ethylenic copolymer (A) has a molecular distribution (Mw/Mn) of preferably from 1.5 to 3.5 and more preferably from 1.5 to 3.0 as measured values by GPC method. Still further, it is desirable that the MFR of the requirement (d) is preferably from 0.1 to 100 g/10 min, more preferably from 0.1 to 40 g/10 min, more preferably from 0.1 to 25 g/10 min and especially preferably from 0.1 to 10 g/10 min.

Crystalline Propylenic Polymer (B3)

A crystalline propylenic polymer (B3) according to the present invention is composed of a crystalline high molecular weight solid product obtained by polymerizing propylene and one or more mono-olefins other than the propylene by either a high pressure method or a low pressure method. The crystalline propylenic polymer (B3) includes, for example, isotactic and syndiotactic propylene homopolymers or a propylene-α-olefin copolymer. These representative resins are commercially available.

When the crystalline propylenic polymer (B3) is a copolymer of propylene and a mono-olefin other than the propylene, a raw material olefin specifically includes ethylene, 1-butene, 1-pentene, 1-hexene, 1-octene, 1-decene, 2-methyl-1-propene, 3-methyl-1-pentene, 4-methyl-1-pentene, 5-methyl-1-hexene and the like. These olefins are used alone or in combination with two or more kinds.

The polymerization mode may be of random type or block type, and any polymerization mode can be employed, as long as a resinous product is obtained. These crystalline propylenic polymers (B3) may be used alone or in combination with two or more kinds.

The crystalline propylenic polymer (B3) used in the present invention has a propylene content in the total constitutional units of 65% by mole or more and preferably 67% by mole or more.

The crystalline propylenic polymer (B3) used in the present invention has an MFR (ASTMD 1238-65T, 230° C.) in the range of usually from 0.01 to 100 g/10 min and especially preferably from 0.05 to 50 g/10 min.

The crystalline propylenic polymer (B3) has a role of improving the fluidity and heat resistance of the composition. In the present invention, the crystalline propylenic polymer (B3) is used in a proportion of usually from 90 to 1 part by mass, preferably from 90 to 5 parts by mass, more preferably from 85 to 10 parts by mass, based on the total 100 parts by mass of the ethylenic copolymer (A) and the crystalline propylenic polymer (B3).

If the crystalline propylenic polymer (B3) is used in the proportion as described above, an olefinic thermoplastic elastomer composition having excellent rubber elasticity and excellent molding processability is obtained.

Softening Agent

As a raw material for the thermoplastic elastomer of the present invention, a softening agent may be used when needed. The softening agent may be oil extended with the ethylenic copolymer (A) or may be added later without performing the oil extension. As the softening agent, a softening agent which is usually used for rubber may be used. There may be specifically mentioned a petroleum-type softening agent such as process oil, lubricating oil, paraffin oil, liquid paraffin, petroleum asphalt, vaseline and the like; a coal-tar-type softening agent such as coal tar, coal tar pitch and the like; a fatty oil such as castor oil, linseed oil, rapeseed oil, soybean oil, coconut oil and the like; tall oil; waxes such as bees wax, carnauba wax, lanolin and the like; a fatty acid or a metal salt thereof such as ricinolic acid, palmitic acid, stearic acid, barium stearate, calcium stearate, zinc laurate and the like; a synthetic high molecular substance such as terpene resin, petroleum resin, coumarone-indene resin, atactic polypropylene and the like; an ester-type softening agent such as dioctyl phthalate, dioctyl adipate, dioctyl sebacate and the like; microcrystalline wax, sub(factice), liquid polybutadiene, modified liquid polybutadiene, liquid Thiokol and others. Among these softening agents, a paraffinic process oil is preferred, and a high viscosity type paraffinic process oil which has a less content of volatile low molecular weight components is particularly preferred. Here, the high viscosity type means that the oil has a kinetic viscosity at 40° C. in the range of 200 to 1000 centistokes.

In the present invention, the blending amount of the softening agent in addition to the oil extended product, is usually 100 parts by mass or less, preferably from 3 to 80 parts by mass and more preferably from 5 to 50 parts by mass, based on the total 100 parts by mass of the ethylenic copolymer (A) and the crystalline propylenic copolymer (B3). If the softening agent is used in the proportion, the resulting thermoplastic elastomer composition is excellent in fluidity during molding, and mechanical properties of the molded article are not decreased.

Other Components

To the thermoplastic elastomer composition of the present invention, an inorganic filler and the like may be blended in addition to the ethylenic copolymer (A), the crystalline propylenic polymer (B3) and a softening agent added when necessary. The inorganic filler specifically includes calcium carbonate, calcium silicate, clay, kaolin, talc, silica, diatomaceous earth, mica powders, asbestos, alumina, barium sulfate, aluminum sulfate, calcium sulfate, basic magnesium carbonate, molybdenum disulfide, graphite, glass fiber, glass beads, shirasu balloon, basicmagnesiumsulfatewhisker, calcium titanate whisker, aluminum borate whisker and the like.

In the thermoplastic elastomer composition of the present invention, from the viewpoint of the rubber elasticity and molding processability of the resulting thermoplastic elastomer composition, the inorganic filler is used in a proportion of usually 100 parts by mass or less and preferably from 2 to 30 parts by mass, based on the total 100 parts by weight of the ethylenic copolymer (A), the crystalline propylenic polymer (B3) and other components used when necessary. Further, in the present invention, a conventionally well-known heat stabilizer, antiaging agent, weather stabilizer, anti-static agent, lubricant such as metal soap, wax and the like, and others may be added in the thermoplastic elastomer composition, as long as the object of the present invention is not impaired.

Thermoplastic Elastomer Composition

The thermoplastic elastomer composition of the present invention is obtained by mixing the ethylenic copolymer (A), the crystalline propylenic polymer (B3), the softening agent, inorganic filler and/or the like blended when necessary, and then by subjecting the resulting mixture to dynamic heat treatment in the presence of a crosslinking agent. Here, the term "dynamic heat treatment" refers to kneading in a melted state. As the crosslinking agent used for the preparation of the thermoplastic elastomer composition of the present invention, there may be mentioned a crosslinking agent generally used in a thermosetting type rubber such as an organic peroxide, a phenolic resin, sulfur, a hydrosilicone compound, an amino resin, quinone or its derivative, an amine compound, an azo compound, an epoxy compound, isocyanate and the like. Among these crosslinking agents, an organic peroxide is particularly preferable.

As the organic peroxide used for the preparation of the thermoplastic elastomer composition of the present invention, there may be specifically mentioned dicumyl peroxide, di-tert-butyl peroxide, 2,5-dimethyl-2,5-di-(tert-butylperoxy)hexane, 2,5-dimethyl-2,5-di-(tert-butylperoxy)hexyne-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butylperoxy benzoate, tert-butylperoxyisopropyl carbonate, diacetyl peroxide, lauroyl peroxide, tert-butylcumyl peroxide and the like.

Of these, from the viewpoint of reactivity, odor and scorch stability, a bifunctional organic peroxide having two peroxide bonds (—O—O—) in one molecule such as 2,5-dimethyl-2,5-di-(tert-butylperoxy)hexane, 2,5-dimethyl-2,5-di-(tert-butylperoxy)hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate and the like are preferred. Among these, 2,5-dimethyl-2,5-di-(tert-butylperoxy)hexane is most preferred.

From the viewpoint of the heat resistance, tensile properties, rubber elasticity and moldability of the resulting thermoplastic elastomer composition, such an organic peroxide is used in an amount of usually from 0.02 to 3 parts by mass and preferably from 0.05 to 1 part by mass, based on the total 100 parts by mass of the ethylenic copolymer (A), the crystalline propylenic polymer (B3) and other components used when necessary.

Upon crosslinking treatment by the organic peroxide, an auxiliary crosslinking agent such as sulfur, p-quinone dioxime, p,p'-dibenzoylquinone dioxime, N-methyl-N-4-dinitrosoaniline, nitrosobenzene, diphenylguanidine, trimethylolpropane-N,N'-m-phenylene dimaleimide, divinylbenzene and triallyl cyanurate; or a polyfunctional methacrylate monomer such as ethylene glycol dimethacrylate, diethylene glycol dimethacrylate, polyethylene glycol dimethacrylate, trimethylolpropane trimethacrylate and allyl methacrylate and a polyfunctional vinyl monomer such as vinyl butyrate and vinyl stearate are blended.

The use of the compounds provides a uniform and mild crosslinking reaction. Especially, in the preparation of the thermoplastic elastomer composition of the present invention, divinylbenzene is most preferable. Divinylbenzene is easy to handle, has good compatibility with the ethylenic copolymer (A) and the crystalline propylenic polymer (B3) which are the main components of the crosslinked product, has a function dissolving an organic peroxide, and acts as a dispersing agent for an organic peroxide, therefore a thermoplastic elastomer composition in which the crosslinking effect by heat treatment is uniform and a balance between fluidity and physical properties is excellent is obtained.

The auxiliary crosslinking agent or the compounds such as the polyfunctional vinyl monomer and the like which are described above are used in an amount of usually 5 parts by mass or less and preferably from 0.3 to 3 parts by mass, based on the total 100 parts by mass of the ethylenic copolymer (A), the crystalline poropylenic polymer (B3) and other components used when necessary. In order to promote the decomposition of the organic peroxide, a decomposition accelerator such as a tertiary amine including triethylamine, tributylamine, 2,4,6-tri(dimethylamino)phenol and the like, and a naphthenate of aluminum, cobalt, vanadium, copper, calcium, zirconium, manganese, magnesium, lead, mercury and the like, and others may be used.

The dynamic heat treatment in the preparation of the thermoplastic elastomer composition of the present invention is preferably conducted in a non-open type apparatus and under an inert atmosphere such as nitrogen, carbon dioxide or the like. The temperature of the heat treatment is in the range from the melting point of the crystalline propylenic polymer (B3) to 300° C., and usually from 150 to 270° C., preferably from 170 to 250° C. The kneading time is usually from 1 to 20 minutes and preferably from 1 to 10 minutes. The shearing force to be applied is in the range from 10 to 50,000 sec$^{-1}$ and preferably from 100 to 20,000 sec$^{-1}$ in terms of the shearing velocity.

As the kneading apparatus, there may be used a mixing roll, an intensive mixer (for example, a Bumbury mixer and a kneader) and a single-screw or twin-screw extruder, and a non-open type apparatus is preferred and a twin-screw extruder is particularly preferred.

Uses of Thermoplastic Elastomer Composition

The thermoplastic elastomer composition of the present invention may be used for various applications without having any restrictions. For example, in a molded article produced from a conventional EPDM, a cost saving may be realized by using the thermoplastic elastomer composition instead of EPDM. In addition, the thermoplastic elastomer composition of the present invention is most suitably molded to use as automotive interior parts or automotive exterior parts. The automotive interior and exterior parts obtained from the thermoplastic elastomer composition of the present invention are usually produced according to the following conventional methods.

(1) The thermoplastic elastomer composition is fed into a plastic processing machine such as extrusion molding machine equipped with a T-die, a calendar molding machine and the like, followed by to mold into a desired shape, for example, a sheet shape and the like.

(2) The thermoplastic elastomer composition is molded into a desired shape by injection molding.

The automotive interior and exterior parts thus obtained may contain, for example, 1 to 200 parts by mass of an olefinic resin based on 100 parts by mass of the olefinic thermoplastic elastomer composition. The olefinic resin used here is not particularly limited, but low density polyethylene, linear low density polyethylene, polypropylene, propylene-ethylene block copolymer, polybutene-1, crystalline ethylene-α-olefin copolymer (for example, ethylene-4-methyl-1-pentene random copolymer) and the like are preferable.

In addition, on the top surface layer of the automotive interior parts obtained from the thermoplastic elastomer composition of the present invention, a surface layer composed of at least one compound selected from polyurethane, saturated polyester, acrylic ester resin, polyvinyl chloride and isocyanate resin may be provided. As the saturated polyester used to form such a surface layer, polyethylene terephthalate, polybutylene terephthalate and derivatives thereof, and the like are used. As the acrylic ester resin, polymethyl (meth)acrylate, polyisobutyl(meth)acrylate, poly-2-ethylhexyl(meth)acrylate and the like are used. Further, as the isocyanate resin, polyhexamethylene diisocyanate, polyisophorone diisocyanate and the like are used.

Such a surface layer preferably has a thickness of 300 μm or less. A primer layer may be interposed between the top surface layer and such a surface layer. Further, the automotive interior and exterior parts obtained from the thermoplastic elastomer composition of the present invention may constitute a laminated product with a polyolefin foamed product or a laminated product with a polyolefin resin. As the polyolefin used here, polyethylene, polypropylene and the like are preferred.

Such a laminate is produced, for example, by extruding the olefinic thermoplastic elastomer composition by an extruder equipped a T-die and then passing the extruded sheet-like thermoplastic elastomer composition in a melted state through a pair of rolls in a condition in which it is laminated with a polyolefin foamed product sheet, or by the sequential injection molding of a polyolefin resin and an olefinic thermoplastic elastomer. Such automotive interior parts include, for example, a top surface layer and the like of a door trim, instrumental panel, ceiling, steering wheel, console box, seat sheet and the like.

EXAMPLES

Hereinafter, the present invention will be explained in more detail with reference to Examples, but it should be construed that the present invention is in no way limited to these Examples.

In the following Examples and Comparative Examples, physical properties were measured or evaluated in the following manners.

[Physical Properties Evaluation of Copolymer]
Density

The density was determined at 23° C. in accordance with ASTM D1505.

MFR

The MFR was determined at 190° C. in accordance with ASTM D1238. The measurement value obtained under a load of 2.16 kg was defined as $MFR_{2.16}$ and the measurement value obtained under a load of 10 kg was defined as $MFR_{10}$.

Molecular Weight Distribution (Mw/Mn)

The molecular weight distribution (Mw/Mn) was determined by gel permeation chromatography (GPC) at 140° C. using o-dichlorobenzene as the solvent. The measurement was made by using Gel Permeation Chromatography Alliance GPC-2000 Model manufactured by Waters Corporation in the following manners. Two columns of TSK gel GNH6-HT and two columns of TSK gel GNH6-HTL (each 7.5 mm in diameter and 300 mm in length) were used, the column temperature was set at 140° C., the mobile phase was o-dichlorobenzene (Wako Pure Chemical Industries, Ltd.) containing 0.025% by mass of BHT (Takeda Pharmaceutical Company Limited) as an antioxidant, the flow rate was 1.0 mL/min, the sample concentration was 15 mg/10 mL, the sample injection volume was 500 μL, and a differential refractometer was used as a detector. Standard polystyrenes manufactured by Toso Corporation, Ltd. were used for Mw<1000 and Mw>4×10$^6$ and those manufactured by Pressure Chemical Company were used for $1000 \leq Mw \leq 4 \times 10^6$.

[Physical Properties Evaluation of Foamed Molded Article]
Specific Gravity

The specific gravity was measured in accordance with JIS K7222. If a foamed product is a cube, the sampling was made from the site which was cut from 20 mm or more inside from each of the four sides of a flat surface of the maximum area and the site which was 2.5 mm or more cut from the surface of the parallel flat surface. In addition, even when the foamed product to be sampled is a cube having various shapes, a sample was prepared from the site which was cut from 20 mm or more inside from each of the ends (side surfaces) and 2.5 mm or more from the surface of the upper and lower surfaces by setting the surface showing the maximum area of the molded article to the upper surface and setting the surface located at the opposite side of the upper surface to the lower surface sandwiching the molded product between the surfaces.

For example, in the case of a midsole, a sample was prepared from the site which was cut 20 mm or more inside from each of the ends and 2.5 mm or more from the both surfaces of the roughly parallel flat-surface.

The measurement is taken as the average of five sites of a molded product. In addition, the difference between the maximum and the minimum measurement values of the specific gravity at the five sites, which is a measure of the uniformity of quality of a molded product, is preferably 0.08 or less and more preferably 0.06 or less. If the range exceeds 0.08, it means that the quality of the molded product (hardness, mechanical properties, compression set and the like) is not constant. The five sites to be measured are shown in FIG. 1.

Compression Set (CS)

The compression set (CS) was measured in accordance with JIS K6262. A foamed product was cut out into a cylindrical shape having a diameter of 30 mm and a length of 15 mm or more, and then each of two parallel flat surfaces of the cylinder was cut off 2.5 mm or more from the surface of the parallel flat surface to use as a sample having a thickness of 10 mm.

In addition, even when a foamed product to be sampled is a cube having various shapes, the foamed product was cut out into a cylindrical shape having a diameter of 30 mm and a length of 15 mm or more, and then each of two parallel flat surfaces of the cylinder was cut off 2.5 mm or more from the surface of the parallel flat surface to use as a sample having a thickness of 10 mm.

In order to cut out from a molded product to a cylindrical shape or cut off a molded product from the surface of a parallel flat surface, a cylindrical cutter may be employed.

The sample was compressed by 50%, left to stand at 50° C. environment for 6 hours, and the compression set was measured 30 minutes after the sample was released from the compression. The compression set (CS) was calculated from the following equation.

$$CS=(t0-t1)/(t0-t2) \times 100$$

t0: The sample original thickness (mm)
t1: The thickness 30 minutes after the sample was removed from the compression apparatus (mm)
t2: The spacer thickness (mm)

Rebound Resilience

The rebound resilience was measured in accordance with JIS K6255. A sample was prepared in the same manner as the sample used in the compression set (CS) described above (2), and the measurement was conducted under an atmosphere at 23° C.

Tear Strength

The tear strength was measured under an environment at 23° C. in accordance with ASTM D3574. A tear tester is used as the testing machine and the tear speed is set at 100 mm/min. The tear strength Tr (N/mm) was calculated from the following equation.

$$Tr = T0/T1 \times 9.81$$

T0: Tear stress (kg)
T1: Sample width (mm)

Asker C Hardness

The Asker C hardness was measured under an environment at 23° C. in accordance with the "Spring Hardness Test Type C Test Method" described in JIS K7312-1996 Annex 2.

[Physical Properties Evaluation of Resinous Composition and Thermoplastic Elastomer]

SWOM

The measurement was conducted at 63° C. without rain using a sunshine weatherometer.

TS [MPa], EL [%] and M100 [MPa]

The tensile test was conducted at a tensile interval of 20 mm and a tensile speed of 200 mm/min in accordance with JIS K6301, and the tensile strength at breakage (TS), elongation at breakage (EL) and modulus of tensile elasticity at 100% elongation (M100) were measured.

EL Residual Percentage (%)

The same measurement as the EL was conducted using a sample after exposing to SWOM for a fixed period of time and the residual percentage was calculated from EL and this measurement value. The percentage is desirably 65% or more.

ΔE (Hunter's Color Difference)

The measurement was conducted in accordance with JIS Z 8730-1980. In addition, the smaller ΔE is the more desirable it is.

Example 1

Production of Ethylene-1-Butene Copolymer A

Copolymerization of ethylene and 1-butene was carried out continuously at a polymerization temperature of 125° C. by using a stainless steel polymerization vessel (stirring rotation number=500 rpm) having a substantial internal volume of 1 L and a stirring blade in a completely filled state. The copolymerization reaction was carried out by continuously supplying hexane at 1.73 L/h, ethylene at 56 g/h, 1-butene at 90 g/h, hydrogen at 0.5 NL/h, bis(p-tolyl)methylene(cyclopentadienyl) (1,1,4,4,7,7,10,10-octamethyl-1,2,3,4,7,8,9,10-octahydrodibenzo(b,h)-fluorenyl)zirconium dichloride at 0.00015 mmol/h, a methylaluminoxane/toluene solution at 0.075 mmol/h in terms of aluminum, and triisobutylaluminum at 1.0 mmol/h from the side of the polymerization vessel to the liquid phase, so that the polymerization pressure was maintained at 3.8 MPaG. Further, a hexane solution of the continuously obtained ethylene-1-butene copolymer was stored in a holding drum, and methanol was added to the solution at 0.2 mL/h as a catalyst deactivating agent to terminate the polymerization.

The hexane solution of the resulting ethylene-1-butene copolymer was taken out every one hour and the polymer was precipitated from the polymerization solution in 2 L of methanol, and the precipitate was dried at 130° C. for 10 hours under vacuum to obtain an ethylene-1-butene copolymer A.

The ethylene-1-butene copolymer A as obtained above had a density of 884 kg/m³ and an MFR (load of 2.15 kg) of 3.7 g/10 min, and was obtained at a yield of 49.0 g/h.

The physical properties are shown in Table 1.

Example 2

Production of Ethylene-1-Butene Copolymer B

An ethylene-1-butene copolymer B was obtained in the same manner as in Example 1 except for changing the polymerization temperature to 130° C. and the feed rate per hour of hexane to 1.82 L/h, 1-butene to 40 g/h, hydrogen to 0.6 NL/h, bis(p-tolyl)methylene(cyclopentadienyl) (1,1,4,4,7,7,10,10-octamethyl-1,2,3,4,7,8,9,10-octahydrodibenzo(b,h)-fluorenyl)zirconium chloride to 0.0001 mmol/h and the methylaluminoxane/toluene solution to 0.05 mmol/h in terms of aluminum.

The ethylene-1-butene copolymer B as obtained above had a density of 907 kg/m³ and an MFR (load of 2.15 kg) of 1.2 g/10 min and was obtained at a yield of 43.5 g/h.

The physical properties are shown in Table 1.

Example 3

Production of Ethylene-1-Butene Copolymer C

An ethylene-1-butene copolymer C was obtained in the same manner as in Example 1 except for changing the polymerization temperature to 110° C. and the feed rate per hour of hexane to 1.50 L/h, 1-butene to 210 g/h, hydrogen to zero, bis(p-tolyl)methylene(cyclopentadienyl) (1,1,4,4,7,7,10,10-octamethyl-1,2,3,4,7,8,9,10-octahydrodibenzo(b,h)-fluorenyl)zirconium dichloride to 0.00035 mmol/h and the methylaluminoxane/toluene solution to 0.175 mmol/h in terms of aluminum.

The ethylene-1-butene copolymer C as obtained above had a density of 860 kg/m³ and an MFR (load of 2.15 kg) of 0.27 g/10 min and was obtained at a yield of 60.8 g/h.

The physical properties are shown in Table 1.

Example 4

Production of Ethylene-1-Butene Copolymer D

An ethylene-1-butene copolymer D was obtained in the same manner as in Example 1 except for changing the polymerization temperature to 110° C. and the feed rate per hour of hexane to 1.45 L/h, 1-butene to 210 g/h, hydrogen to 0.1 NL/h, bis(p-tolyl)methylene(cyclopentadienyl) (1,1,4,4,7,7,10,10-octamethyl-1,2,3,4,7,8,9,10-octahydrodibenzo(b,h)-fluorenyl) zirconium dichloride to 0.00035 mmol/h and the methylaluminoxane/toluene solution to 0.175 mmol/h in terms of aluminum.

The ethylene-1-butene copolymer D as obtained above had a density of 860 kg/m³ and an MFR (load of 2.15 kg) of 0.48 g/10 min, and was obtained at a yield of 62.0 g/h.

The physical properties are shown in Table 1.

Example 5

Production of Ethylene-1-Octene Copolymer E

An ethylene-1-octene copolymer E was obtained in the same manner as in Example 1 except for changing the polymerization temperature to 150° C., the feed rate per hour of hexane to 1.40 L/h and ethylene to 94 g/h, the 1-butene to 1-octene at 286 g/h, and the feed rate per hour of hydrogen to zero, bis(p-tolyl)methylene(cyclopentadienyl) (1,1,4,4,7,7,10,10-octamethyl-1,2,3,4,7,8,9,10-octahydrodibenzo(b,h)-fluorenyl) zirconium dichloride to 0.003 mmol/h and the methylaluminoxane/toluene solution to 0.15 mmol/h in terms of aluminum.

The ethylene-1-octene copolymer E as obtained above had a density of 872 kg/m³ and an MFR (load of 2.15 kg) of 1.1 g/10 min, and was obtained at a yield of 75.0 g/h.

The physical properties are shown in Table 1.

Example 6

Production of Ethylene-1-Octene Copolymer F

An ethylene-1-octene copolymer F was obtained in the same manner as in Example 5 except for changing the polymerization temperature to 130° C., and the feed rate per hour of hexane to 1.27 L/h, 1-octene to 380 g/h, bis(p-tolyl)methylene(cyclopentadienyl) (1,1,4,4,7,7,10,10-octamethyl-1,2,3,4,7,8,9,10-octahydrodibenzo(b,h)-fluorenyl)zirconium dichloride to 0.005 mmol/h and the methylaluminoxane/toluene solution to 0.25 mmol/h in terms of aluminum.

The ethylene-1-octene copolymer F as obtained above had a density of 871 kg/m³ and an MFR (load of 2.15 kg) of 0.5 g/10 min, and was obtained at a yield of 109.6 g/h.

The physical properties are shown in Table 1.

Comparative Example 1

Production of Ethylene-1-Butene Copolymer G

An ethylene-1-butene copolymer G was obtained in the same manner as in Example 1 except for changing the polymerization temperature to 105° C., the feed rate per hour of hexane to 1.78 L/h, 1-butene to 100 g/h and hydrogen to 0.7 NL/h, the bis(p-tolyl)methylene(cyclopentadienyl) (1,1,4,4,7,7,10,10-octamethyl-1,2,3,4,7,8,9,10-octahydrodibenzo(b,h)-fluorenyl)zirconium chloride to [dimethyl(t-butylamide)(tetramethyl-5-cyclopentadienyl)silane]titanium dichloride at 0.0004 mmol/h, the methylaluminoxane/toluene solution to triphenylcarbenium(tetrakispentafluorophenyl)borate at 0.004 mmol/h, and the feed rate per hour of triisobutylaluminum to 0.2 mmol/h.

The ethylene-1-butene copolymer G as obtained above had a density of 904 kg/m³ and an MFR (load of 2.15 kg) of 3.3 g/10 min, and was obtained at a yield of 48.5 g/h.

The physical properties are shown in Table 2.

Comparative Example 2

Production of Ethylene-1-Butene Copolymer H

An ethylene-1-butene copolymer H was obtained in the same manner as in Comparative Example 1 except for changing the polymerization temperature to 110° C., and the feed rate per hour of hexane to 1.81 L/h, 1-butene to 45 g/h, hydrogen to 0.3 NL/h, [dimethyl(t-butylamide)(tetramethyl-η5-cyclopentadienyl)silane]titanium dichloride to 0.0003 mmol/h and triphenylcarbenium(tetrakispentafluorophenyl) borate to 0.003 mmol/h.

The ethylene-1-butene copolymer H as obtained above had a density of 906 kg/m³ and an MFR (load of 2.15 kg) of 1.2 g/10 min, and was obtained at a yield of 44.5 g/h.

The physical properties are shown in Table 2.

Comparative Example 3

Production of Ethylene-1-Butene Copolymer I

An ethylene-1-butene copolymer I was obtained in the same manner as in Comparative Example 1 except for changing the polymerization temperature to 130° C., the feed rate per hour of hexane to 1.82 L/h, 1-butene to 35 g/h and hydrogen to 0.7 NL/h, the [dimethyl(t-butylamide)(tetramethyl-η5-cyclopentadienyl)silane]titanium dichloride to rac-dimethylsilylene-bis{1-(2-methyl-4-phenyl-1-indenyl)} zirconium dichloride at 0.0001 mmol/h, the triphenylcarbenium(tertrakispentafluorophenyl)borate to methylaluminoxane-toluene-solution at 0.05 mmol/h, and the feed rate per hour of triisobutylaluminum to 1.0 mmol/h.

The ethylene-1-butene copolymer I as obtained above had a density of 870 kg/m³ and an MFR (load of 2.15 kg) of 1.2 g/10 min, and was obtained at a yield of 45.4 g/h.

The physical properties are shown in Table 2.

Comparative Example 4

Production of Ethylene-1-Butene Copolymer J

An ethylene-1-butene copolymer J was obtained in the same manner as in Comparative Example 1 except for changing the polymerization temperature to 80° C., and the feed rate per hour of hexane to 1.48 L/h, 1-butene to 240 g/h, hydrogen to 0.8 NL/h, [dimethyl(t-butylamide)(tetramethyl-η5-cyclopentadienyl)silane]titanium dichloride to 0.0002 mmol/h and triphenylcarbenium(tetrakispentafluorophenyl) borate to 0.002 mmol/h.

The ethylene-1-butene copolymer J as obtained above had a density of 859 kg/m³ and an MFR (load of 2.15 kg) of 0.26 g/10 min and was obtained at a yield of 62.1 g/h.

The physical properties are shown in Table 2.

Comparative Example 5

Production of Ethylene-1-Butene Copolymer K

An ethylene-1-butene copolymer K was obtained in the same manner as in Comparative Example 1 except for changing the polymerization temperature to 110° C., and the feed rate per hour of hexane to 1.48 L/h, 1-butene to 240 g/h, hydrogen to 0.7 NL/h, [dimethyl(t-butylamide)(tetramethyl-η5-cyclopentadienyl)silane]titanium dichloride to 0.0003 mmol/h and triphenylcarbenium(tetrakispentafluorophenyl) borate to 0.003 mmol/h.

The ethylene-1-butene copolymer K as obtained above had a density of 861 kg/m³ and an MFR (load of 2.15 kg) of 2.8 g/10 min, and was obtained at a yield of 42.7 g/h.

The physical properties are shown in Table 2.

Comparative Example 6

Production of Ethylene-1-Butene Copolymer L

An ethylene-1-butene copolymer L was obtained in the same manner as in Comparative Example 1 except for changing the polymerization temperature to 80° C., the feed rate per hour of hexane to 0.86 L/h, 1-butene to 600 g/h and hydrogen to 0.1 NL/h, the [dimethyl(t-butylamide)(tetramethyl-η5-cyclopentadienyl)silane]titanium dichloride to bis(1,3-dimethylcyclopentadienyl)zirconium dichloride at 0.03 mmol/h, the triphenylcarbenium(tetrakispentafluorophenyl)borate to a methylaluminoxane-toluene solution at 1.5 mmol/h, and the feed rate per hour of triisobutylaluminum to 1.0 mmol/h.

The ethylene-1-butene copolymer L as obtained above had a density of 861 kg/m$^3$ and an MFR (load of 2.15 kg) of 0.54 g/10 min and was obtained at a yield of 60.1 g/h.

The physical properties are shown in Table 2.

Comparative Example 7

Production of Ethylene-1-Octene Copolymer M

An ethylene-1-octene copolymer M was obtained in the same manner as in Comparative Example 1 except for changing the polymerization temperature to 150° C., the feed rate per hour of hexane to 1.55 L/h, the 1-butene to 1-octene at 240 g/h, the feed rate per hour of hydrogen to 0.1 NL/h, the [dimethyl(t-butylamide)(tetramethyl-η5-cyclopentadienyl)silane]titanium dichloride to rac-dimethylsilylene-bis{1-(2-methyl-4-phenyl-1-indenyl)}zirconium dichloride at 0.003 mmol/h, the triphenylcarbenium(tetrakispentafluorophenyl)borate to a methylaluminoxane-toluene solution at 0.15 mmol/h, and the feed rate per hour of triisobutylaluminum to 1.0 mmol/h.

The ethylene-1-octene copolymer M as obtained above had a density of 870 kg/m$^3$ and an MFR (load of 2.15 kg) of 1.2 g/10 min and was obtained at a yield of 76.2 g/h.

The physical properties are shown in Table 2.

Comparative Example 8

Production of Ethylene-1-Octene Copolymer N

An ethylene-1-octene copolymer N was obtained in the same manner as in Comparative Example 1 except for changing the polymerization temperature to 75° C., the feed rate per hour of hexane to 1.4 L/h, 1-octene to 350 g/h and hydrogen to 0.1 NL/h, the [dimethyl(t-butylamide)(tetramethyl-η5-cyclopentadienyl)silane]titanium dichloride to bis(1,3-dimethylcyclopentadienyl)zirconium dichloride at 0.02 mmol/h, and the triphenylcarbenium(tetrakispentafluorophenyl)borate to a methylaluminoxane-toluene solution at 1.0 mmol/h.

The ethylene-1-octene copolymer N as obtained above had a density of 869 kg/m$^3$ and an MFR (load of 2.16 kg) of 0.5 g/10 min, and was obtained at a yield of 60.0 g/h.

The physical properties are shown in Table 2.

TABLE 1

|  | Example 1 | Example 2 | Example 3 | Example 4 | Example 5 | Example 6 |
|---|---|---|---|---|---|---|
| Copolymer | A | B | C | D | E | F |
| Copolymerization Monomer Species | Ethylene/1-Butene | Ethylene/1-Butene | Ethylene/1-Butene | Ethylene/1-Butene | Ethylene/1-Octene | Ethylene/1-Octene |
| Density [kg/m$^3$] | 884 | 907 | 860 | 860 | 872 | 871 |
| Ethylene Content [mol %] | 88.6 | 95.2 | 81.0 | 81.2 | 87.8 | 87.5 |
| MFR (load of 2.16 kg) [g/10 min] | 3.7 | 1.2 | 0.27 | 0.48 | 1.1 | 0.5 |
| MFR$_{10}$/MFR$_{2.16}$ | 6.5 | 7.7 | 6.5 | 6.5 | 8.1 | 8.2 |
| Mw/Mn | 2.0 | 2.1 | 2.1 | 2.0 | 2.1 | 2.1 |
| Vinyl-Group Content [number of vinyl groups/1000 carbon atoms] | 0.07 | 0.09 | 0.06 | 0.06 | 0.12 | 0.15 |

TABLE 2

|  | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Copolymer | G | H | I | J | K | L | M | N |
| Copolymerization Monomer Species | Ethylene/1-Butene | Ethylene/1-Butene | Ethylene/1-Butene | Ethylene/1-Butene | Ethylene/1-Butene | Ethylene/1-Butene | Ethylene/1-Octene | Ethylene/1-Octene |
| Density [kg/m$^3$] | 884 | 906 | 904 | 859 | 861 | 859 | 870 | 869 |
| Ethylene Content [mol %] | 88.6 | 94.8 | 94.5 | 80.0 | 81.2 | 80.2 | 87.0 | 86.2 |
| MFR (load of 2.16 kg) [g/10 min] | 3.3 | 1.2 | 1.2 | 0.26 | 2.8 | 0.49 | 1.2 | 0.5 |
| MFR$_{10}$/MFR$_{2.16}$ | 6.7 | 7.7 | 10.5 | 6.9 | 6.5 | 6.7 | 8.4 | 6.8 |
| Mw/Mn | 2.2 | 2.0 | 2.2 | 2.0 | 2.0 | 2.0 | 2.1 | 2.2 |
| Vinyl-Group Content [number of vinyl groups/1000 carbon atoms] | 0.04 | 0.05 | 0.08 | 0.03 | 0.03 | 0.05 | 0.05 | 0.04 |

Example 7

A mixture composed of 100 parts by weight of the ethylene-1-butene copolymer A obtained in Example 1, 3.0 parts by weight of zinc oxide, 0.7 part by weight of dicumylperoxide (DCP), 0.1 part by weight (as the TAIC content) of triallylisocyanurate (TAIC) (Trade name: M-60 (the content of TAIC is 60%), manufactured by Nippon Kasei Chemical Co., Ltd.) and 5.2 parts by weight of azodicarbonamide were kneaded by a roll at a roll surface temperature of 120° C. for 10 minutes, and then the kneaded mixture was molded into a sheet shape.

The resulting sheet was filled in a press mold, and pressurized and heated under the conditions of a pressure of 150 kg/cm$^2$ and a temperature of 155° C. for 30 minutes to obtain a primary crosslinked foamed product. The size of this press mold was 15 mm in thickness, 150 mm in length and 200 mm in width.

Next, the primary crosslinked foamed product was subjected to the compression molding under the conditions of a pressure of 150 kg/cm$^2$ and a temperature of 155° C. for 10 minutes to obtain a secondary crosslinked foamed product. The size of the resulting secondary crosslinked foamed product was 15 mm in thickness, 160 mm in length and 250 mm in width.

Then, the specific gravity, compression set, tear strength, Asker C hardness and impact resilience of the secondary crosslinked foamed product were measured by the methods. The results are shown in Table 3.

In addition, the MFR of the crosslinked foamed product was tried to measure under a load of 2.16 kg at 190° C., but the crosslinked foamed product had no fluidity. That is, the crosslinked foamed product had an MFR of 0.01 g/10 min or less.

Example 8

A secondary crosslinked foamed product was prepared in the same manner as in Example 7 except for using 100 parts by weight of the ethylene-1-butene copolymer B obtained in Example 2 instead of 100 parts by weight of the ethylene-1-butene copolymer A and changing the amount of azodicarbonamide from 5.2 parts by weight to 4.8 parts by weight. The physical properties of the secondary crosslinked foamed product were measured and the results are shown in Table 3.

In addition, the MFR of the crosslinked foamed product was tried to measure under a load of 2.16 kg at 190° C., but the crosslinked foamed product had no fluidity. That is, the crosslinked foamed product had an MFR of less than 0.01 g/10 min.

Example 9

A secondary crosslinked foamed product was prepared in the same manner as in Example 7 except for using 100 parts by weight of the ethylene-1-butene copolymer D obtained in Example 4 instead of 100 parts by weight of the ethylene-1-butene copolymer A. The physical properties of the secondary crosslinked foamed product were measured and the results are shown in Table 3.

In addition, the MFR of the crosslinked foamed product was tried to measure under a load of 2.16 kg at 190° C., but the crosslinked foamed product had no fluidity. That is, the crosslinked foamed product had an MFR of less than 0.01 g/10 min.

Example 10

A secondary crosslinked foamed product was prepared in the same manner as in Example 7 except for using 100 parts by weight of the ethylene-octene copolymer E obtained in Example 5 instead of 100 parts by weight of the ethylene-1-butene copolymer A. The physical properties of the secondary crosslinked foamed product were measured and the results are shown in Table 3.

In addition, the MFR of the crosslinked foamed product was tried to measure under a load of 2.16 kg at 190° C., but the crosslinked foamed product had no fluidity. That is, the crosslinked foamed product had an MFR of less than 0.01 g/10 min.

Comparative Example 9

A secondary crosslinked foamed product was prepared in the same manner as in Example 7 except for using 100 parts by weight of the ethylene-1-butene copolymer G obtained in Comparative Example 1 instead of 100 parts by weight of the ethylene-1-butene copolymer A and changing the amount of azodicarbonamide from 5.2 parts by weight to 4.8 parts by weight. The physical properties of the secondary crosslinked foamed product were measured and the results are shown in Table 3.

In addition, the MFR of the crosslinked foamed product was tried to measure under a load of 2.16 kg at 190° C., but the crosslinked foamed product had no fluidity. That is, the crosslinked foamed product had an MFR of less than 0.01 g/10 min.

Comparative Example 10

A secondary crosslinked foamed product was prepared in the same manner as in Example 7 except for using 100 parts by weight of the ethylene-1-butene copolymer H obtained in Comparative Example 2 instead of 100 parts by weight of the ethylene-1-butene copolymer A and changing the amount of azodicarbonamide from 5.2 parts by weight to 4.8 parts by weight. The physical properties of the secondary crosslinked foamed product were measured and the results are shown in Table 3.

In addition, the MFR of the crosslinked foamed product was tried to measure under a load of 2.16 kg at 190° C., but the crosslinked foamed product had no fluidity. That is, the crosslinked foamed product had an MFR of less than 0.01 g/10 min.

Comparative Example 11

A secondary crosslinked foamed product was prepared in the same manner as in Example 7 except for using: 100 parts by weight of the ethylene-1-butene copolymer I obtained in Comparative Example 3 instead of 100 parts by weight of the ethylene-1-butene copolymer A and changing the amount of azodicarbonamide from 5.2 parts by weight to 4.8 parts by weight. The physical properties of the secondary crosslinked foamed product were measured and the results are shown in Table 3.

In addition, the MFR of the crosslinked foamed product was tried to measure under a load of 2.16 kg at 190° C., but the crosslinked foamed product had no fluidity. That is, the crosslinked foamed product had an MFR of less than 0.01 g/10 min.

Comparative Example 12

A secondary crosslinked foamed product was prepared in the same manner as in Example 7 except for using 100 parts by weight of the ethylene-1-butene copolymer L obtained in Comparative Example 6 instead of 100 parts by weight of the ethylene-1-butene copolymer A and changing the amount of azodicarbonamide from 5.2 parts by weight to 4.8 parts by weight. The physical properties of the secondary crosslinked foamed product were measured and the results are shown in Table 3.

In addition, the MFR of the crosslinked foamed product was tried to measure under a load of 2.16 kg at 190° C., but the crosslinked foamed product had no fluidity. That is, the crosslinked foamed product had an MFR of less than 0.01 g/10 min.

Comparative Example 13

A secondary crosslinked foamed product was prepared in the same manner as in Example 7 except for using 100 parts by weight of the ethylene-1-octene copolymer M obtained in Comparative Example 7 instead of 100 parts by weight of the ethylene-1-butene copolymer A and changing the amount of azodicarbonamide from 5.2 parts by weight to 4.8 parts by weight. The physical properties of the secondary crosslinked foamed product were measured and the results are shown in Table 3.

In addition, the MFR of the crosslinked foamed product was tried to measure under a load of 2.16 kg at 190° C., but the crosslinked foamed product had no fluidity. That is, the crosslinked foamed product had an MFR of less than 0.01 g/10 min.

The ethylene-1-butene copolymer O as obtained above was obtained at a yield of 62.0 g/h, and had a density of 0.860 g/cm$^3$ and an MFR (load of 2.16 kg at 190° C.) of 0.48 g/10 min, an Mw/Mn of 2.1, an MFR$_{10}$/MFR$_{2.16}$ of 6.5 and a content of vinyl groups of 0.06 per 1000 carbon atoms.

Comparative Example 14

Preparation of Catalyst Solution

Into a glass flask fully purged with nitrogen gas, 0.63 mg of bis(1,3-dimethylcyclopentadienyl)zirconium dichloride was added, and 1.57 mL of a toluene solution of methylaminoxane (AL; 0.13 mmol/L) and 2.43 mL of toluene were further added to obtain a catalyst solution.

Production of Ethylene-1-Butene Copolymer P

The atmosphere in a stainless steel autoclave having a substantial internal volume of 2 L was fully replaced with nitrogen and then the autoclave was charged with 912 mL of hexane, 320 mL of 1-butene and 0 mL of hydrogen and the temperature in the system was increased to 80° C. Subsequently, polymerization was started by injecting 0.9 mmol of triisobutylaluminum and 2.0 mL of the catalyst solution

TABLE 3

| | | Example 7 | Example 8 | Example 9 | Example 10 | Comparative Example 9 | Comparative Example 10 | Comparative Example 11 | Comparative Example 12 | Comparative Example 13 |
|---|---|---|---|---|---|---|---|---|---|---|
| Polymer Used | | A | B | D | E | G | H | I | L | M |
| Physical Properties (Product Compressed by 150%) | Specific Gravity | 0.11 | 0.10 | 0.11 | 0.11 | 0.11 | 0.10 | 0.09 | 0.11 | 0.11 |
| | Rebound Resilience (%) | 62 | 41 | 78 | 73 | 62 | 41 | 42 | 78 | 74 |
| | Tear Strength (N/mm) | 2.2 | 2.1 | 1.9 | 2 | 2.2 | 2.1 | 2.2 | 1.9 | 2 |
| | Asker C Hardness | 43 | 61 | 33 | 38 | 39 | 53 | 55 | 29 | 33 |
| | Compression Set (CS) (%) | 72 | 51 | 83 | 81 | 78 | 65 | 58 | 88 | 89 |

Example 11

Production of Ethylene-1-Butene Copolymer O

Copolymerization of ethylene and 1-butene was carried out continuously at a polymerization temperature of 110° C. by using a stainless steel polymerization vessel (stirring rotation number=500 rpm) having a substantial internal volume of 1 L and a stirring blade in a completely filled state. The copolymerization reaction was carried out by continuously supplying hexane at 1.32 L/h, ethylene at 56 g/h, 1-butene at 210 g/h, hydrogen at 0.1 NL/h, bis(p-tolyl)methylene(cyclopentadienyl) (1,1,4,4,7,7,10,10-octamethyl-1,2,3,4,7,8,9,10-octahydrodibenzo(b,h)-fluorenyl)zirconium dichloride at 0.00035 mmol/h, a tailor made methylaluminoxane/hexane solution (Trade name: TMAO-341) manufactured by Toso Finechem Corporation at 0.18 mmol/h in terms of aluminum and triisobutylaluminum at 1.0 mmol/h from the side of the polymerization vessel to the liquid phase, so that the polymerization pressure was maintained at 3.8 MPaG. Further, a hexane solution of the continuously obtained ethylene-1-butene copolymer was stored in a holding drum, and methanol was added to the solution at 0.2 mL/h as a catalyst deactivating agent to terminate the polymerization.

The hexane solution of the resulting ethylene-1-butene copolymer was taken out every one hour and the polymer was precipitated from the polymerization solution in 2 L of methanol, and the precipitate was dried at 130° C. for 10 hours under vacuum to obtain an ethylene-1-butene copolymer O.

(0.0005 mmol as Zr) as prepared above into the system with ethylene. Thereafter, the total pressure therein was kept at 8.0 kg/cm$^2$-G by continuous supply of ethylene so as to perform the polymerization at 80° C. for 30 minutes.

The polymerization was stopped by adding a small amount of ethanol to the system, and then unreacted ethylene was purged. The resulting polymer solution was immersed in a largely excessive amount of methanol to precipitate a polymer. The polymer was recovered by filtration, and the filtered polymer was dried overnight under a reduced pressure to obtain an ethylene-1-butene copolymer P.

The ethylene-1-butene copolymer P as obtained above had a density of 0.861 g/cm$^3$ and an MFR (load of 2.16 kg at 190° C.) of 0.50 g/10 min, an Mw/Mn of 2.0, an MFR$_{10}$/MFR$_{216}$ of 6.0 and a content of vinyl groups of 0.05 per 1000 carbon atoms.

Example 12

By using two rolls, the ethylene-1-butene copolymer O obtained in Example 11 was melt-mixed with an ethylenic copolymer rubber 1 (an ethylene-propylene-ethylidenenorbornene copolymer rubber manufactured by Mitsui Chemicals Inc., Trade name: EPT 3045, ethylene content: 68 mol %, diene content: 6 mol %, ML$_{1+4}$ (100° C.): 45) in a proportion of 35 parts by mass of the ethylene-1-butene copolymer O to 65 parts by mass of the ethylenic copolymer rubber 1, and 2 parts by mass of DCP (dicumylperoxide, manufactured by Kayaku Akuzo Corporation) were further blended and melt-mixed based on the total 100 parts by mass of the ethylene-1-butene copolymer O and the ethylenic copolymer rubber 1 shown in Table 4. The physical properties of the press sheet were measured and the results are shown in Table 4.

TABLE 4

|  |  | Example 12 | Example 13 | Example 14 | Comparative Example 15 | Comparative Example 16 | Comparative Example 17 | Comparative Example 18 |
|---|---|---|---|---|---|---|---|---|
| Copolymer O/Copolymer Rubber 1 (parts by mass/parts by mass) |  | 35/65 | 50/50 | 50/50 |  |  |  |  |
| Copolymer P/Copolymer Rubber 1 (parts by mass/parts by mass) |  |  |  |  | 35/65 | 50/50 | 0/100 | 15/85 |
| DCP |  | 2 | 2 | 1.6 | 2 | 2 | 2 | 2 |
| TS [Mpa] |  | 3.8 | 4.2 | 3.1 | 3.0 | 3.1 | 1.7 | 2.3 |
| EL [%] |  | 630 | 700 | 740 | 640 | 720 | 570 | 590 |
| SWOM 500 hr | ΔE | +0.3 | +0.3 | +0.3 | +0.3 | +0.3 | +0.6 | +0.5 |
| | EL Residual Percentage [%] | 77 | 83 | 88 | 80 | 87 | 61 | 62 |
| SWOM 2000 hr | ΔE | +0.3 | +0.3 | +0.3 | +0.3 | +0.3 | +0.6 | +0.5 |
| | EL Residual Percentage [%] | 61 | 63 | 67 | 65 | 68 | 55 | 57 | to obtain a resinous composition. Thereafter, the resinous composition was subjected to thermal molding in a press molding machine set at 160° C. for 30 minutes to obtain a press sheet with a thickness of 2 mm. The physical properties of the press sheet were measured and the results are shown in Table 4.

Example 13

A resinous composition was prepared to produce a press sheet in the same manner as in Example 12 except for setting the use ratio of the ethylene-1-butene copolymer O to the ethylenic copolymer rubber 1 at the ratio of (ethylene-1-butene copolymer O)/(ethylenic copolymer rubber 1)=50 parts by mass/50 parts by mass. The physical properties of the press sheet were measured and the results are shown in Table 4.

Example 14

A resinous composition was prepared to produce a press sheet in the same manner as in Example 12 except for setting the use ratio of the ethylene-1-butene copolymer O to the ethylenic copolymer rubber 1 at the ratio of (ethylene-1-butene copolymer O)/(ethylenic copolymer rubber 1)=50 parts by mass/50 parts by mass and further changing the blending amount of DCP to 1.6 parts by mass based on the total 100 parts by mass of the ethylene-1-butene copolymer O and the ethylenic copolymer rubber 1. The physical properties of the press sheet were measured and the results are shown in Table 4.

Comparative Example 15

A resinous composition was prepared to produce a press sheet in the same manner as in Example 12 except for using the ethylene-1-butene copolymer P obtained in Comparative Example 14 instead of the ethylene-1-butene copolymer O. The physical properties of the press sheet were measured and the results are shown in Table 4.

Comparative Examples 16 to 18

A resinous composition was prepared to produce a press sheet in the same manner as in Comparative Example 15 except for changing the use ratio of the ethylene-1-butene copolymer P to the ethylemic copolymer rubber 1 to that Example 15

50 parts by mass of the ethylene-1-butene copolymer O obtained in Example 11, 50 parts by mass of a polypropylene (an isotactic block polypropylene which is a propylene-ethylene block copolymer, melting point (Tm): 160° C., MFR (load of 2.16 kg, 230° C.): 0.5 g/10 min, ethylene content: 10 mass %, n-decane soluble content: 12 mass %) and 0.4 part by mass of DCP (dicumylperoxide, manufactured by Kayaku Akuzo Corporation) were sufficiently mixed in a Henschel mixer, and then the mixture was subjected to dynamic heat treatment using a twin-screw extruder (TEX 30 mm) under the following conditions to prepare a thermoplastic elastomer.

Dynamic Heat Treatment Conditions: Temperature Setting C1/C2/C3/C4/C5/C6/C7/C8/C9/C10/D=140/140/160/180/190/200/200/210/220/220/200 [° C.], Extruder Rotation Speed: 280 rpm, and Extrusion Amount: 10 kg/h Thereafter, the prepared thermoplastic elastomer was subjected to thermal molding in a press molding machine set at 190° C. for 4 minutes to obtain a press sheet with a thickness of 2 mm. The individual items were measured and the results are shown in Table 5.

Example 16

A thermoplastic elastomer was prepared to obtain a press sheet in the same manner as in Example 15 except for using 40 parts by mass of paraffin oil (PW-90, manufactured by Idemitsu Kosan Co., Ltd., kinetic viscosity at 40° C.: 95.5 cst) in addition to 50 parts by mass of the copolymer O, 50 parts by mass of the polypropylene and 0.4 part by mass of DCP. The physical properties of the press sheet were measured and the results are shown in Table 5.

Comparative Example 19

A thermoplastic elastomer was prepared to obtain a press sheet in the same manner as in Example 15 except for using an ethylenic copolymer rubber 2 (ethylene content: 80 mol %, diene content: 3.8 mol %, $ML_{1+4}$ (100° C.): 70) instead of the ethylene-1-butene copolymer O. The physical properties of the press sheet were measured and the results are shown in Table 5.

Comparative Example 20

A thermoplastic elastomer was prepared to obtain a press sheet in the same manner as in Example 16 except for using the ethylenic copolymer rubber 2 (ethylene content: 80 mol %, diene content: 3.8 mol %, $ML_{1+4}$ (100° C.): 70) instead of the ethylene-1-butene copolymer O. The physical properties of the press sheet were measured and the results are shown in Table 5.

TABLE 5

|  | Example 15 | Example 16 | Comparative Example 19 | Comparative Example 20 |
| --- | --- | --- | --- | --- |
| Ethylene-1-Butene Copolymer O | 50 | 50 | | |
| Ethylenic Copolymer Rubber 2 | | | 50 | 50 |
| Polypropylene | 50 | 50 | 50 | 50 |
| DCP | 0.4 | 0.4 | 0.4 | 0.4 |
| Paraffin Oil | 0 | 40 | 0 | 40 |
| TS(MPa) | 14 | 12 | 12 | 10 |
| EL(%) | 640 | 750 | 600 | 700 |
| M100 | 7.2 | 4.5 | 7.0 | 4.5 |

Industrial Applicability

Since the ethylenic copolymer (A) of the present invention is excellent in crosslinking properties, it may be suitably used for the various applications of a molded article in which excellent heat resistance and hardness are required.

In addition, the ethylenic copolymer of the present invention may be blended with various resins to produce a resinous composition having improved crosslinking properties, and the resulting resinous composition may be used to produce various kinds of molded articles without any limitation.

The first ethylenic copolymer composition of the present invention may be used for foam molding, and the resulting foamed molded article may be suitably used, for example, as footwear parts such as midsoles, inner soles, soles and the like.

Since the second ethylenic copolymer composition of the present invention is excellent in balance between weather stability and mechanical strength, it is suitable for an application such as an electric wire coating material and the like, and is suitable to produce an electric wire coating material which is a molded article obtained from the composition and an electric wire provided with an electric wire sheath.

The thermoplastic elastomer of the present invention may be widely used as an alternative to EPDM, for example, may be used as a raw material of automotive interior and exterior parts.

The invention claimed is:

1. An ethylenic copolymer (A) obtained by copolymerizing only ethylene and 1-butene, and satisfying the following requirements (a) to (d):
    (a) the number of vinyl groups per 1000 carbon atoms being 0.06 to 1, as measured by infrared absorption spectroscopy,
    (b) a $MFR_{10}/MFR_{2.16}$, which represents ratio between a melt flow rate measured at 190° C. under a load of 10 kg in accordance with ASTM D1238 and a melt flow rate measured at 190° C. under a load of 2.16 kg in accordance with ASTM D1238, being 7.7 or less,
    (c) a density being 0.850 to 0.910 g/cm$^3$,
    (d) the $MFR_{2.16}$ being 0.1 to 25 g/10 min, and
    wherein the ethylene content of the ethylenic copolymer (A) is 80 to 95% by mole in the total constitutional units.

2. An ethylenic copolymer composition comprising the ethylenic copolymer (A) according to claim 1 and an ethylene-polar monomer copolymer (B1) in a proportion of 100 to 20 parts by mass of (A) and 0 to 80 parts by mass of (B1) (provided that the total of (A) and (B1) is 100 parts by mass).

3. The ethylenic copolymer composition according to claim 2, wherein the composition further comprises a radical generator (C) in the range of 0.1 to 2.0 parts by mass based on the total 100 parts by mass of the ethylenic copolymer (A) and the ethylene-polar monomer copolymer (B1).

4. The ethylenic copolymer composition according to claim 2, wherein the composition further comprises a radical generatot (C) in the range of 0.1 to 2.0 parts by mass and a foaming agent (D) in the range of 0.1 to 30 parts by mass based on the total 100 parts by mass of the ethylenic copolymer (A) and the ethylene-polar monomer copolymer (B1).

5. A foamed molded article obtained by crosslinking foaming of the ethylenic copolymer composition according to claim 2.

6. A foamed molded article comprising a laminate comprising a layer composed of one or more kinds of raw materials selected from the group consisting of polyolefin, polyurethane, rubber, leather and artificial leather and the foamed molded article according to claim 5.

7. The foamed molded article according to claim 5, wherein the foamed molded article is a footwear part.

8. The foamed molded article according to claim 7, wherein the footwear part is a midsole, an inner sole or a sole.

9. A method for producing a foamed molded article, comprising crosslinking foaming of the ethylenic copolymer composition according to claim 2.

10. A method for producing a foamed molded article, comprising steps of crosslinking foaming of the ethylenic copolymer composition according to claim 2 and compression molding of the resulting foamed product.

11. An ethylenic copolymer composition comprising the ethylenic copolymer (A) according to claim 1 and an ethylene-α-olefin having 3 to 20 carbon atoms-non-conjugated polyene copolymer (B2) having a content of a constitutional unit derived from ethylene in the range of 50 to 85% by mole and a content of a constitutional unit derived from non-conjugated polyene in the range of 0.01 to 30% by mole (provided that the total of the constitutional unit derived from ethylene, the constitutional unit derived from an α-olefin having 3 to 20 carbon atoms and the content of the constitutional unit derived from non-conjugated polyene is 100% by mole) in a proportion of 100 to 31 parts by mass of (A) and 0 to 69 parts by mass of (B2) (provided that the total of (A) and (B2) is 100 parts by mass).

12. The ethylenic copolymer composition according to claim 11, wherein the composition further comprises an inorganic filler in the range of 1 to 250 parts by mass based on the total 100 parts by mass of the ethylenic copolymer (A) and the ethyleneα-olefin having 3 to 20 carbon atoms-non-conjugated polyene copolymer (B2).

13. The ethylenic copolymer composition according to claim 11, wherein the composition further comprises a radical generator (C) in the range of 0.1 to 15 parts by mass based on the total 100 parts by mass of the ethylenic copolymer (A) and the ethylene-α-olefin having 3 to 20 carbon atoms-non-conjugated polyene copolymer (B2).

14. The ethylenic copolymer composition according to claim 11, wherein a Mooney viscosity ($ML_{1+4}$) of the ethylene-α-olefin having 3 to 20 carbon atoms-non-conjugated polyene copolymer (B2) at 100° C. is in the range of 10 to 300.

15. A molded article obtained from the ethylenic copolymer composition according to claim 11.

16. The molded article according to claim 15, wherein the molded article is obtained by crosslinking the ethylenic copolymer composition.

17. The molded article according to claim 15, wherein the molded article is an electric wire coating material or an electric wire sheath.

18. An electric wire provided with an electric wire coating material and/or an electric wire sheath composed of the molded article according to claim 17.

19. A thermoplastic elastomer obtained by dynamically crosslinking a mixture comprising 10 to 99 parts by mass of the ethylenic copolymer (A) according to claims 1 and 90 to 1 part by mass of a crystalline propylenic polymer (B3) (provided that the total of (A) and (B3) is 100 parts by mass).

* * * * *